(12) United States Patent
Uchida et al.

(10) Patent No.: US 8,199,278 B2
(45) Date of Patent: *Jun. 12, 2012

(54) SURFACE LIGHT SOURCE DEVICE

(75) Inventors: Tatsuo Uchida, Sendai (JP); Yoshito Suzuki, Sendai (JP); Tohru Kawakami, Sendai (JP); Takahiro Ishinabe, Sendai (JP); Baku Katagiri, Sendai (JP); Yoshihiro Hashimoto, Osaka (JP); Shoichi Ishihara, Osaka (JP); Shuichi Kozaki, Osaka (JP); Yutaka Ishii, Osaka (JP)

(73) Assignees: Sharp Kabushiki Kaisha, Osaka (JP); Tohoku University, Sendai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/057,184

(22) PCT Filed: Aug. 4, 2009

(86) PCT No.: PCT/JP2009/063821
§ 371 (c)(1),
(2), (4) Date: Feb. 2, 2011

(87) PCT Pub. No.: WO2010/016497
PCT Pub. Date: Feb. 11, 2010

(65) Prior Publication Data
US 2011/0141715 A1    Jun. 16, 2011

(30) Foreign Application Priority Data
Aug. 5, 2008 (JP) .................. 2008-201581

(51) Int. Cl.
*G02F 1/1335* (2006.01)
(52) U.S. Cl. ............ 349/61; 349/56; 349/62; 349/67; 349/84; 349/104; 362/609; 362/611; 362/615

(58) Field of Classification Search ............ 349/56, 349/61, 62, 67, 84, 104, 113; 362/609, 611, 362/615
See application file for complete search history.

(56) References Cited

U.S. PATENT DOCUMENTS
6,288,760 B1    9/2001    Sawayama
(Continued)

FOREIGN PATENT DOCUMENTS
JP    5-303094 A    11/1993
(Continued)

OTHER PUBLICATIONS

Uchida et al., "Surface Light Source Device", U.S. Appl. No. 13/056,174, filed Jan. 27, 2011.
(Continued)

*Primary Examiner* — Jennifer Doan
(74) *Attorney, Agent, or Firm* — Keating & Bennett, LLP

(57) ABSTRACT

Surface light source device includes: point light sources (13); light guide plate (1) having (i) two end parts in length direction, one of which serves as incident surface (2), and (ii) two end parts in thickness direction which serve as exit surface (7) and back surface (8), light guide plate (1) directing light, emitted from point light sources (13), incident on incident surface (2), so as to cause light to exit from substantially entire area of exit surface (7); and reflector (14) which reflects, toward incident surface (2), part of light which is emitted from point light sources (13) and is then reflected from incident surface (2). Incident surface (2) has elliptic arc (10) which is concave part having surface shape along elliptic arc identical to elliptic arc which is part of ellipse (31) having two focal points corresponding to point light sources (13) and reflector (14). Point light sources (13) and reflector (14) are provided on ellipse focal point lines (11 and 12) obtained by moving two focal points in width direction of light guide plate (1).

26 Claims, 10 Drawing Sheets

U.S. PATENT DOCUMENTS

| | | | |
|---|---|---|---|
| 6,962,430 B2 * | 11/2005 | Ito et al. | 362/634 |
| 7,726,864 B2 * | 6/2010 | Hara et al. | 362/620 |
| 2002/0085150 A1 | 7/2002 | Funamoto et al. | |
| 2004/0001345 A1 | 1/2004 | Lee et al. | |
| 2011/0199786 A1 * | 8/2011 | Uchida et al. | 362/609 |

FOREIGN PATENT DOCUMENTS

| | | |
|---|---|---|
| JP | 7-287226 A | 10/1995 |
| JP | 10-268308 A | 10/1998 |
| JP | 11-52372 A | 2/1999 |
| JP | 2000-19517 A | 1/2000 |
| JP | 2002-258277 A | 9/2002 |
| JP | 2004-127918 A | 4/2004 |
| JP | 2004-264699 A | 9/2004 |
| JP | 2005-215667 A | 8/2005 |

OTHER PUBLICATIONS

Official Communication issued in International Patent Application No. PCT/JP2009/063825, mailed on Nov. 17, 2009.

Official Communication issued in International Patent Application No. PCT/JP2009/063821, mailed on Nov. 17, 2009.

* cited by examiner

FIG. 10
(a)
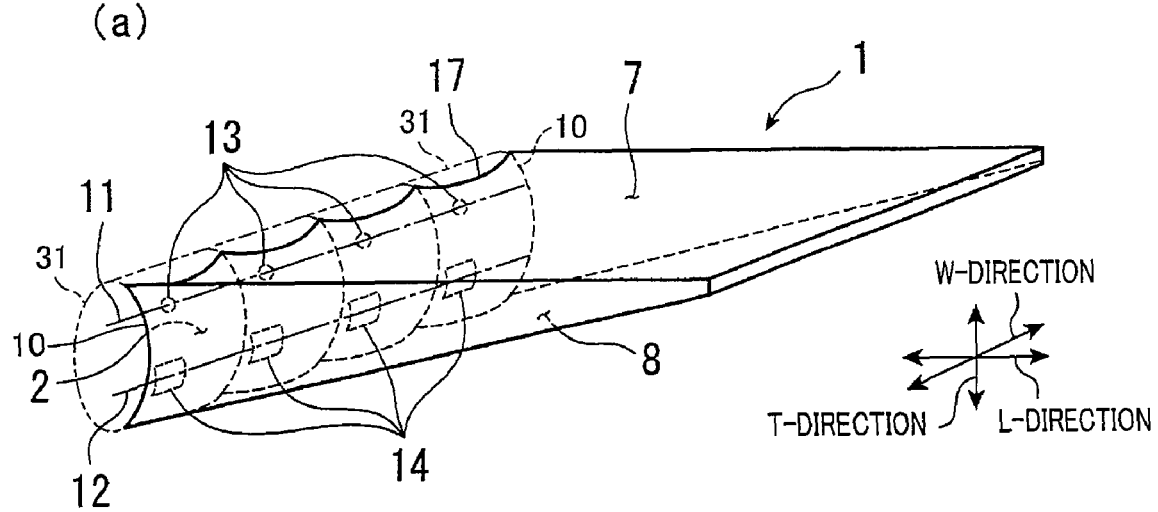
(b)
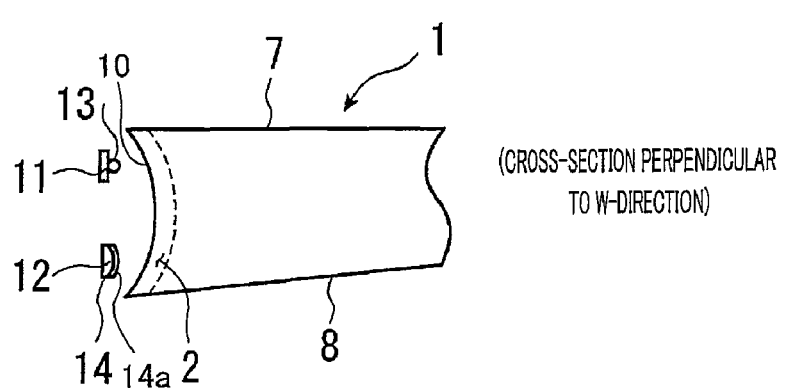
(CROSS-SECTION PERPENDICULAR TO W-DIRECTION)
(c)
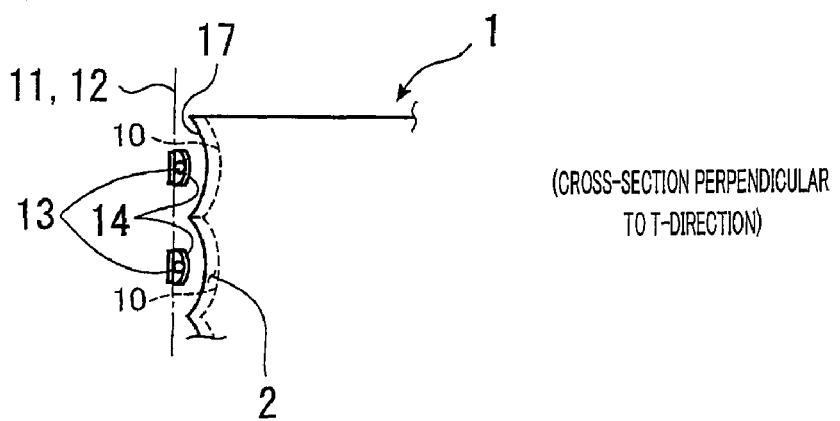
(CROSS-SECTION PERPENDICULAR TO T-DIRECTION)

FIG. 13
(a)
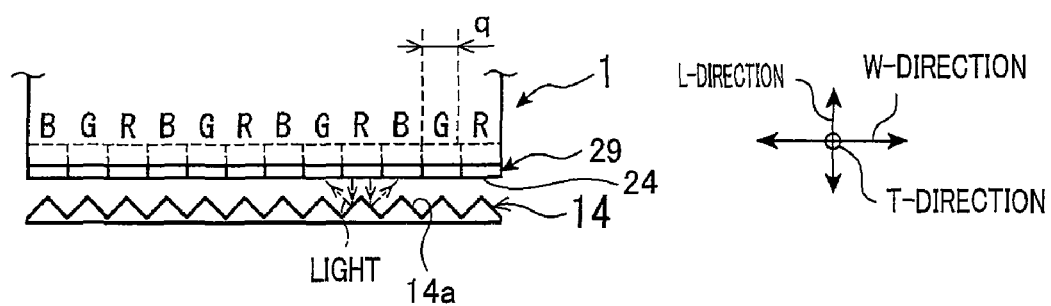
(b)
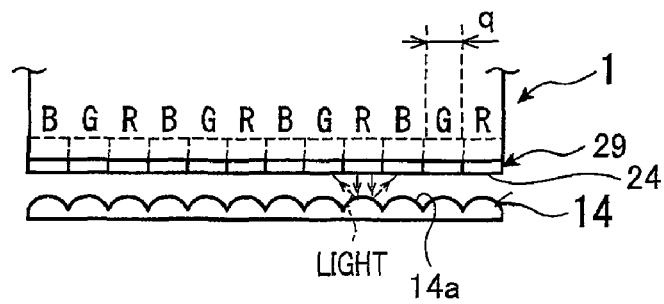

(CROSS-SECTION PERPENDICULAR TO W-DIRECTION)

SURFACE LIGHT SOURCE DEVICE

TECHNICAL FIELD

The present invention relates to a surface light source device. Specifically, the present invention relates to a surface light source device serving as a backlight for a transmissive LCD (Liquid Crystal Display) or a semi-transmissive LCD, an auxiliary light source (front light) for a reflective LCD, or the like.

BACKGROUND ART

There has been known a surface light source device employing a light guide plate (see Patent Literatures 1 through 3, for example).

The light guide plate is designed and produced so as to (i) have: two end parts in its length direction, at least one of which serves as a incident surface; and two end parts in its thickness direction, which serve as an exit surface and a back surface, respectively, and (ii) direct light, emitted from a light source, incident on the incident surface, so as to cause the light to exit from a substantially entire area of the exit surface.

The light that has entered into the light guide plate is totally reflected from the exit surface and the back surface of the light guide plate, so as to exit from a substantially entire area of the exit surface.

It is desirable that the surface light source device (i) has less leakage of light from the back surface of the light guide plate, (ii) emits more light from the exit surface of the light guide plate, and (iii) has uniform luminance distribution in the light-emitting surface.

In view of such a light source device, there has been conventionally known, as an advantageous technique, the use of a light guide plate which has a wedge shape as being viewed cross-sectionally in a direction orthogonal to a width direction of the light guide plate, which wedge shape has, in its length direction, (i) a root end part (an end part having a greater thickness), a surface of which serves as the incident surface, and (ii) a pointed end part. Such a light guide plate can direct more light toward its pointed end part. Therefore, a surface light source device including the light guide plate whose cross-sectional shape is a wedge shape has been widely applied to the surface light source device.

CITATION LIST

Patent Literature 1
Japanese Patent Application Publication, Tokukaihei, No. 10-268308 A (Publication Date: Oct. 9, 1998)
Patent Literature 2
Japanese Patent Application Publication, Tokukaihei, No. 11-052372 A (Publication Date: Feb. 26, 1999)
Patent Literature 3
Japanese Patent Application Publication, Tokukai, No. 2002-258277 A (Publication Date: Sep. 11, 2002)

SUMMARY OF INVENTION

Technical Problem

However, a conventional surface light source device (conventional device) has a problem in that a utilization ratio of light (source light) emitted from a light source is insufficient for the reason that a part of the source light does not enter the light guide plate.

FIG. 16 shows a cross-section perpendicular to the width direction.

FIG. 17 shows a cross-section perpendicular to the width direction.

Figure 16:
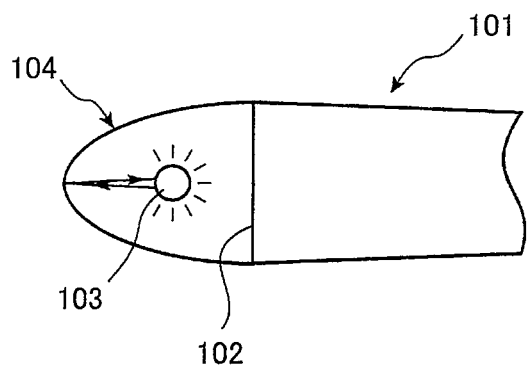
FIG. 16 is a cross-sectional view (schematic cross-sectional view showing a cross-section perpendicular to a width direction of a light guide plate) schematically illustrating one example of an arrangement of a conventional surface light source device. Specifically.

As illustrated in FIG. 16 for example, in a case where a CCFL (cold-cathode fluorescent lamp) is adopted as a light source of the conventional surface light source device, a CCFL 103 is opposed to an incident surface 102 of a light guide plate 101, and the CCFL 103 and the incident surface 102 are enclosed by a reflector 104 whose inner surface serves as a reflecting surface.

However, light emitted from the CCFL 103 in a direction opposite to the light guide plate 101 which light is a part of light emitted from the CCFL 103 in all directions is reflected from the reflector 104 so as to be incident on the CCFL 103. As a result, the light is absorbed by the CCFL 103. This causes a loss of the light.

Figure 17:
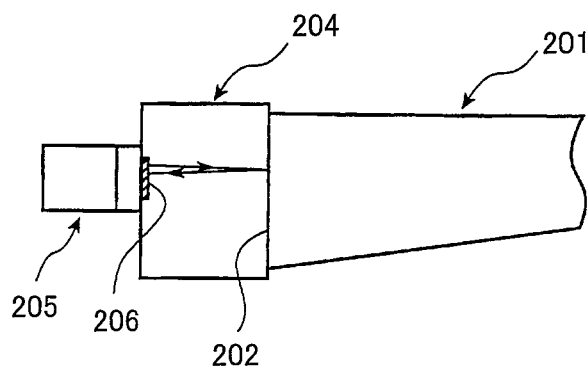
FIG. 17 is a cross-sectional view (schematic cross-sectional view showing a cross-section perpendicular to the width direction of the light guide plate) schematically illustrating another example of the arrangement of the conventional surface light source device. Specifically.

As illustrated in FIG. 17 for example, in a case where an LED (Light-Emitting Diode) is adopted as a light source of the conventional surface light source device, an LED light-emitting surface 206 of an LED package 205 is opposed to an incident surface 202 of a light guide plate 201, and the LED light-emitting surface 206 and the incident surface 202 are enclosed by a reflector 204 whose inner surface serves as a reflecting surface.

However, light reflected from the incident surface 2 of the light guide plate 201 which light is a part of light emitted from the LED light-emitting surface 206 is incident on the LED light-emitting surface 206. As a result, the light is absorbed by the LED light-emitting surface 206. This causes a loss of the light.

The present invention was made in view of the problem. An object of the present invention is to provide a surface light source device which makes it possible to reduce a loss of light in a stage of light incidence from a light source to a light guide plate.

Solution to Problem

The inventors of the present invention found a measure for attaining the object, and as a result, achieved the following present invention.

In order to attain the object, a surface light source device of the present invention includes: at least one light source; a light guide plate having (i) two end parts in its length direction, at least one of which serves as an incident surface, and (ii) two end parts in its thickness direction which serve as an exit surface and a back surface, the light guide plate directing light, emitted from the at least one light source, incident on the incident surface, so as to cause the light to exit from a substantially entire area of the exit surface, and at least one reflector which reflects and directs, toward the incident surface, part of the light which is emitted from the at least one light source and is then reflected from the incident surface, the incident surface having at least one concave part whose shape is identical to an elliptic arc which is a part of at least one ellipse having a first focal point which corresponds to said at least one light source and a second focal point which corresponds to said at least one reflector, and said at least one light source and said at least one reflector being respectively provided on first and second trajectory straight lines parallel to each other, the first trajectory straight line being obtained by moving the first focal point in a width direction of the light guide plate, the second trajectory straight line being obtained by moving the second focal point in the width direction, the first and second focal points being focal points of the at least one ellipse including a surface shape of the at least one concave part as its elliptic arc.

According to the arrangement, the light source and the reflector correspond respectively to the two focal points of the ellipse including the concave part as its elliptic arc. Accordingly, light which is incident on the concave part from the light source located on one of the two parallel trajectory straight lines so as to be reflected from the concave part (first reflected light) mostly converges on the other one of the two parallel trajectory straight lines. Accordingly, the reflector located on the other one of the two parallel trajectory straight lines can reflect substantially all the first reflected light toward the concave part.

The arrangement makes it possible to provide a surface light source device which makes it possible to drastically reduce a loss of light in the stage of light incidence from the light source to the light guide plate as compared to conventional cases.

The surface light source device is preferably arranged such that: said at least one concave part is provided singly in the thickness direction; and at least a line of intersection of (i) a part of the incident surface other than a peripheral part of the incident surface and (ii) a plane perpendicular to the width direction of the light guide plate defines a single elliptic arc along a surface shape of the concave part.

According to the arrangement, the concave part is provided at least to the part of the incident surface other than a peripheral part thereof, and the concave part is provided singly in the thickness direction.

At least the part of the incident surface other than the peripheral part has a shape of the elliptic arc, as described above. This makes it possible to easily adjust respective positions of the light source and the reflector, and improve an efficiency of light incident on the incident surface (i.e., an efficiency of light incident on the incident surface from the light source and an efficiency of light incident on the incident surface from the reflector).

Further, in a case where the concave part is thus provided singly in the thickness direction, it becomes possible to easily design and inexpensively manufacture the surface light source device.

Further, the surface light source device is preferably arranged such that: said at least one concave part is made up of a plurality of concave parts provided in the thickness direction; at least a line of intersection of (i) a part of the incident surface other than a peripheral part of the incident surface and (ii) a plane perpendicular to the width direction of the light guide plate defines combined elliptic arcs along respective surface shapes of the plurality of concave parts; and in each of the plurality of concave parts, a corresponding light source and a corresponding reflector being respectively provided on first and second trajectory straight lines parallel to each other, the first trajectory straight line being obtained by moving a corresponding first focal point of a corresponding ellipse in a width direction, and the second trajectory straight line being obtained by moving a corresponding second focal point of the corresponding ellipse in the width direction, the corresponding first focal point and the corresponding second focal point being focal points of the corresponding ellipse including corresponding one of the plurality of concave parts as its elliptic arc.

According to the arrangement, the concave part is provided at least to the part of the incident surface other than a peripheral part thereof, and the concave part is made up of a plurality of concave parts provided in the thickness direction.

At least the part of the incident surface other than the peripheral part has a shape of the elliptic arc, as described above. This makes it possible to easily adjust respective positions of the light source and the reflector, and improve an efficiency of light incident on the incident surface (i.e., an efficiency of light incident on the incident surface from the light source and an efficiency of light incident on the incident surface from the reflector).

Further, providing the plurality of concave parts in the thickness direction makes it possible to increase an amount of light incident on the light guide plate.

Further, in order to attain the object, a surface light source device of the present invention includes: at least one light source; a light guide plate having (i) two end parts in its length direction, at least one of which serves as an incident surface, and (ii) two end parts in its thickness direction which serve as an exit surface and a back surface, the light guide plate directing light, emitted from the at least one light source, incident on the incident surface, so as to cause the light to exit from a substantially entire area of the exit surface, and at least one reflector which reflects and directs, toward the incident surface, part of the light which is emitted from the at least one light source and is then reflected from the incident surface, the incident surface having at least one concave part, having a pseudo-elliptic arc, in which (i) a line of intersection of the incident surface and a plane perpendicular to the width direction of the light guide plate is a curve or a broken line and (ii) the line of intersection substantially coincides with a part of at least one ellipse having a first focal point which corresponds to said at least one light source and a second focal point which corresponds to said at least one reflector, and said at least one light source and said at least one reflector being respectively provided on first and second trajectory straight lines parallel to each other, the first trajectory straight line being obtained by moving the first focal point in a width direction of the light guide plate, the second trajectory straight line being obtained by moving the second focal point in the width direction.

According to the arrangement, a degree of convergence of light (first reflected light) which has been incident on the concave part from the light source and then reflected from the concave part somewhat decreases as compared to a case where the concave part has a shape identical to the elliptic arc which is a part of the ellipse having the two focal points corresponding respectively to the light source and the reflector. However, the arrangement makes it possible to obtain a sufficiently commensurate effect of reducing a loss of light, as compared to conventional cases.

This makes it possible to provide a surface light source device which makes it possible to reduce a loss of light in the stage of light incidence from the light source to the light guide plate as compared to conventional cases.

Since the light source can give directivity to a light distribution and thereby direct almost all source light toward an incident surface 2, the surface light source device is preferably arranged such that said at least one light source is at least one light source selected from the group consisting of a white LED light source, an RGB-LED light source, a multicolor LED light source, an organic EL light source, and a laser light source.

Further, from a viewpoint of utilization efficiency of reflected light, the surface light source device is preferably arranged such that a reflecting surface of said at least one reflector is any one of a flat surface, a spherical surface, a surface of an elliptic tube, and a combination of at least two thereof.

Further, the surface light source device is preferably arranged such that a direction in which the reflecting surface of said at least one reflector faces is adjusted so that a principal ray reflected from the reflecting surface intersects with a trajectory straight line which is obtained by moving, in the width direction of the light guide plate, an intersection point of (i) a minor axis of said at least one ellipse of the elliptic arc and (ii) the elliptic arc.

This makes it possible to further increase light incident on the incident surface which light is a part of light reflected from the reflector (increase, particularly, light incident on the concave part). This further increases a utilization ratio of the source light.

Further, the surface light source device is preferably arranged such that a direction in which said at least one light source faces is adjusted so that a principal ray emitted from said at least one light source intersects with the trajectory straight line which is obtained by moving the intersection point of (i) the minor axis of said at least one ellipse of the elliptic arc and (ii) the elliptic arc.

This makes it possible to further increase light incident on the incident surface which light is a part of light emitted from the light source (increase, particularly, light incident on the concave part). This further increases a utilization ratio of the source light.

Further, the surface light source device is preferably arranged such that: a line of intersection of said at least one concave part and a plane perpendicular to the thickness direction of the light guide plate has a same line shape as a line of intersection of a cylindrical aspheric lens array and a plane perpendicular to an axis of the cylindrical aspheric lens array; and the reflecting surface of said at least one reflector has a shape similar to the surface shape of said at least one concave part.

This makes it possible to further increase light incident on the incident surface which light is a part of light emitted from the light sources. In addition, it is possible to further increase light incident on the reflecting surfaces of the reflectors which light is a part of light (first reflected light) reflected from the incident surface, and further increase light incident on the incident surface which light is a part of light reflected from the reflecting surfaces. This increases, to a substantially maximum extent, a utilization efficiency of light in the stage of light incidence from the light source to the light guide plate.

Further, the surface light source device preferably further includes at least one dichroic filter for reflecting light, having a wavelength other than a specific wavelength, which is emitted from said at least one light source so as to selectively allow light having the specific wavelength to pass through, said at least one dichroic filter having a concave surface and a convex back surface, the concave surface and the convex back surface having a same surface shape as said at least one concave part, the convex back surface being attached to said at least one concave part so as to match said at least one concave part.

According to the arrangement, light reflected from the dichroic filter converges on the reflector so as to be reflected from the reflector toward the dichroic filter, as is the case with the light reflected from the incident surface having no dichroic filter. This also makes it possible to reduce a loss of light in the stage of light incidence from the light source to the light guide plate.

Further, the surface light source device is preferably arranged such that: said at least one dichroic filter is made up of a plurality of dichroic filters provided in the width direction of the light guide plate; any neighboring dichroic filters of the plurality of dichroic filters each selectively allow light having a different wavelength to pass thorough; and the reflecting surface of said at least one reflector has a surface shape in which a shape made up of two planes of a prism, which two planes are connected to each other, a shape of a columnar aspheric lens, or a combination thereof is repeated in the width direction of the light guide plate at intervals of not more than intervals at which said at least one dichroic filter is provided.

Further, the surface light source device is preferably arranged such that: said at least one dichroic filter is made up of a plurality of dichroic filters provided in the width direction of the light guide plate; any neighboring dichroic filters of the plurality of dichroic filters each selectively allow light having a different wavelength to pass thorough; and the reflecting surface of said at least one reflector has, in the width direction of the light guide plate at intervals of not more than intervals at which said at least one dichroic filter is provided, a surface shape of (i) repetition of a shape made up of two planes of a prism, which two planes are connected to each other, (ii) repetition of a shape of a columnar aspheric lens, or (iii) a shape in which at least one shape made up of two planes of a prism, which two planes are connected to each other, and at least one shape of the columnar aspheric lens are mixed and combined with each other.

This reduces light which is incident on the reflector from one of the dichroic filters so as to be reflected from the reflector toward the same dichroic filter. This reduces a loss of the light, thereby increasing a utilization ratio of the source light.

Further, the surface light source device preferably further includes: a polarization element for selectively allowing only light, which is polarized in one direction and has a corresponding wavelength, out of the light emitted from said at least one light source to pass through the polarization element; and a quarter wave plate, having a wide viewing angle, for changing, by 90°, a polarization direction of light which is reflected from the polarization element, said polarization element having a concave surface and a convex back surface, the concave surface and the convex back surface having a same surface shape as said at least one concave part, the convex back surface being attached to the incident surface in accordance with the surface shape of the at least one concave part, and the quarter wave plate being provided on the reflecting surface of said at least one reflector.

Further, the surface light source device preferably further includes: a polarization element for selectively allowing only light, which is polarized in one direction and has a corresponding wavelength, out of the light emitted from said at least one light source to pass through the polarization element; and a quarter wave plate, said polarization element having a concave surface and a convex back surface, the concave surface and the convex back surface having a same surface shape as said at least one concave part, the convex back surface being attached to the incident surface in accordance with the surface shape of the at least one concave part, and the quarter wave plate being provided on the reflecting surface of said at least one reflector.

According to the arrangement, light reflected from the polarization element converges on the reflector, as is the case with the light reflected from the incident surface having no polarization element. The light which have thus converged on the reflector passes through the quarter wave plate having a wide viewing angle toward the reflector so that a polarization direction of the light is changed by 90°. Then, the light is reflected from the reflecting surface of the reflector so that a polarization direction of the light is changed by 180°. Then, the light passes through the quarter wave plate having a wide viewing angle again so that the polarization direction of the light is changed by 90°. As a result, the light has the same polarization direction as the source light so as to be incident on the polarization element. As a result, a polarizing axis of the light incident on the polarization element substantially coincides with a polarizing axis of the polarization element. Therefore, most light passes through the light guide plate.

The arrangements make it possible to further improve a utilization efficiency of the source light incident on the light guide plate, and allow light having a small unevenness in light polarization to be incident on the light guide plate.

Further, the surface light source device preferably further includes a reflecting mirror facing the back surface of the light guide plate, the reflecting mirror having a reflecting surface which faces the back surface of the light guide plate and whose area is not less than an area of the back surface of the light guide plate.

According to the arrangement, light leaked from the back surface of the light guide plate can be reflected from the reflecting mirror so as to be incident on the back surface. Further, the arrangement allows the light leaked from the back surface of the light guide plate to have a large proportion of light which is reflected from the reflecting mirror so as to be incident on the back surface. This further increase a utilization ratio of the source light.

Advantageous Effects of Invention

The incident surface includes the concave part having a shape identical to the elliptic arc which is a part of the ellipse having the two focal points corresponding respectively to the light source and the reflector. Alternatively, the incident surface is arranged such that: the line of intersection of the incident surface and a plane perpendicular to the width direction resides in a zonal region having a width (i) whose center line is an elliptic arc which is a part of the ellipse having the two focal points corresponding respectively to the light source and the reflector and (ii) which is not more than 20% of the length of the major axis of the ellipse; and the incident surface includes a concave part whose surface shape is a pseudo-elliptic arc and is a curve or a broken line, which connects with both ends of the zonal region in a length direction thereof. In each case, the light source and the reflector are located respectively on one and the other of the two parallel trajectory straight lines which are obtained by moving the two focal points of the ellipse in the width direction.

The light source and the reflector correspond to the two focal points of the ellipse, respectively. Therefore, in a case where the concave part has a surface shape along the elliptic arc of the ellipse, light which is incident on the concave part from the light source located on one of the two parallel trajectory straight lines so as to be reflected from the concave part (first reflected light) mostly converges on the other one of the two parallel trajectory straight lines.

As described above, the light source and the reflector correspond to the two focal points of the ellipse, respectively. Accordingly, the more similar shape to the shape of the elliptic arc of the ellipse the concave part has, the larger proportion of light incident on the other one of the two parallel trajectory straight lines the light reflected from the concave part (first reflected light) has.

Therefore, in a case where the concave part thus has the surface shape along the pseudo-elliptic arc which substantially coincides with the elliptic arc of the ellipse, the light which is incident on the concave part from the light source located on one of the two parallel trajectory straight lines so as to be reflected from the concave part (first reflected light) is likely to converge on the other one of the two parallel trajectory straight lines, as compared to a case where the incident surface, the light source, and the reflector do not have the aforementioned relation.

Therefore, in each case, the arrangement makes it possible to reduce a loss of light incident on the incident surface from the light source, as compared to conventional cases. This makes it possible to increase a utilization ratio of the source light, as compared to conventional cases.

Figure 1:
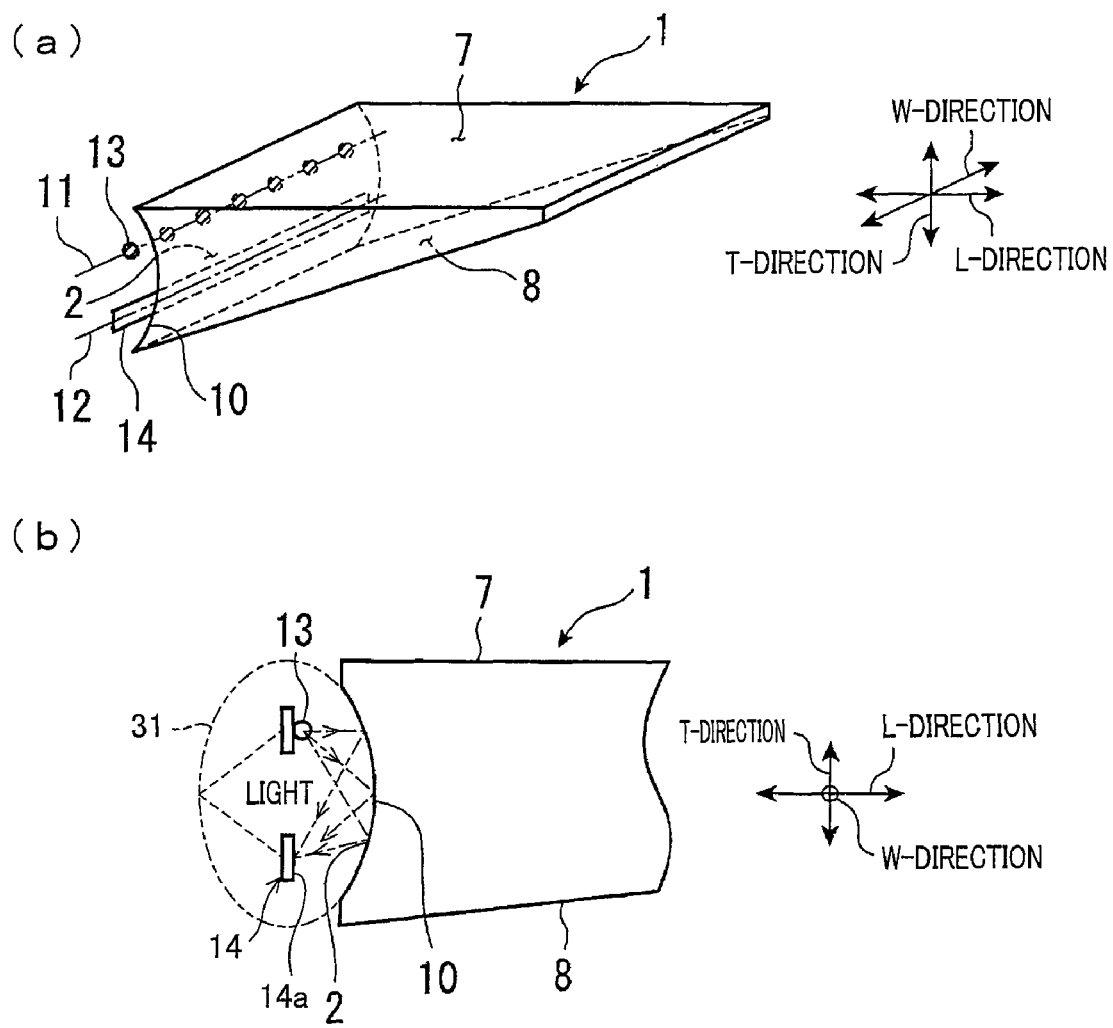

BRIEF DESCRIPTION OF DRAWINGS (a) of FIG. 1 is a perspective view schematically illustrating one example of an arrangement of a surface light source device of a first embodiment of the present invention. (b) of FIG. 1 is a cross-sectional view schematically illustrating an arrangement of the vicinity of an incident surface of the surface light source device of (a) of FIG. 1.

Figure 2:
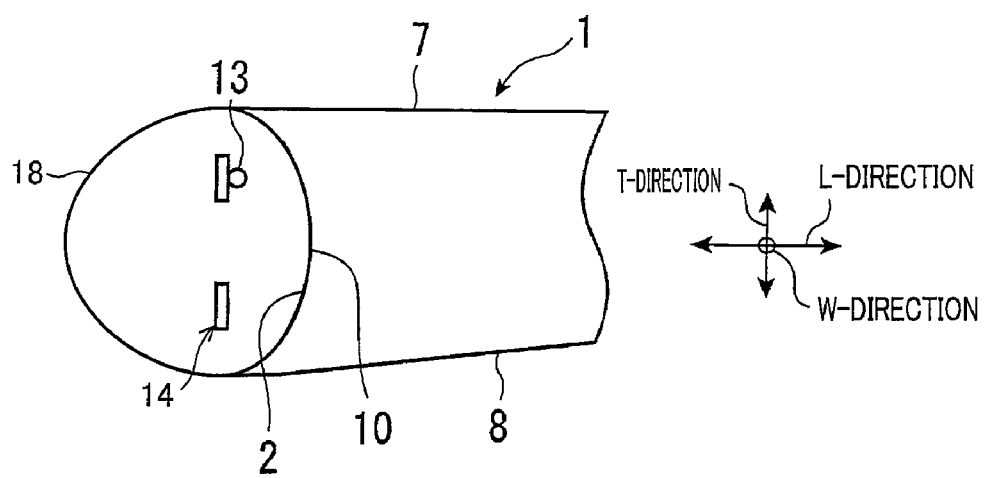

FIG. 2 is a cross-sectional view schematically illustrating an arrangement of the vicinity of the incident surface of the surface light source device of the first embodiment of the present invention to which incident surface a reflector is provided.

Figure 3:
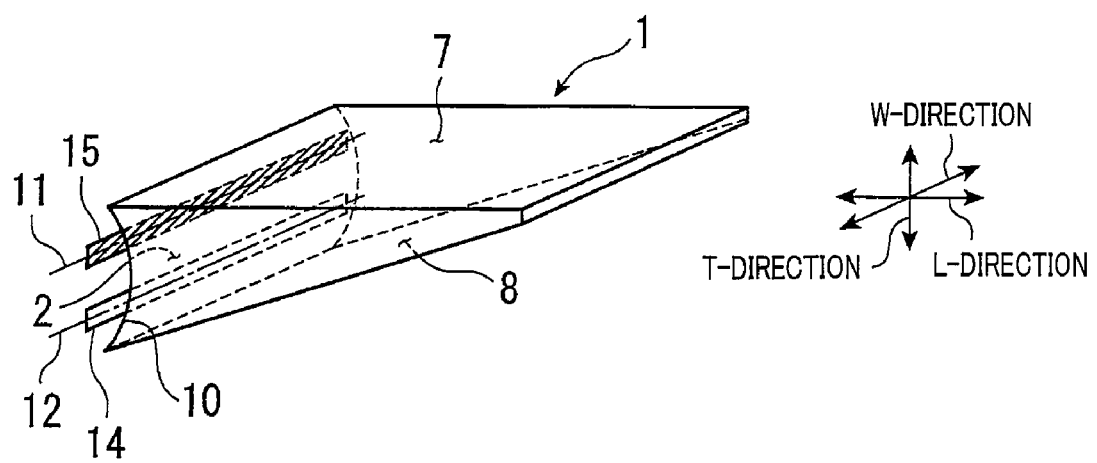

FIG. 3 is a perspective view schematically illustrating another example of an arrangement of the surface light source device of the first embodiment of the present invention.

Figure 4:
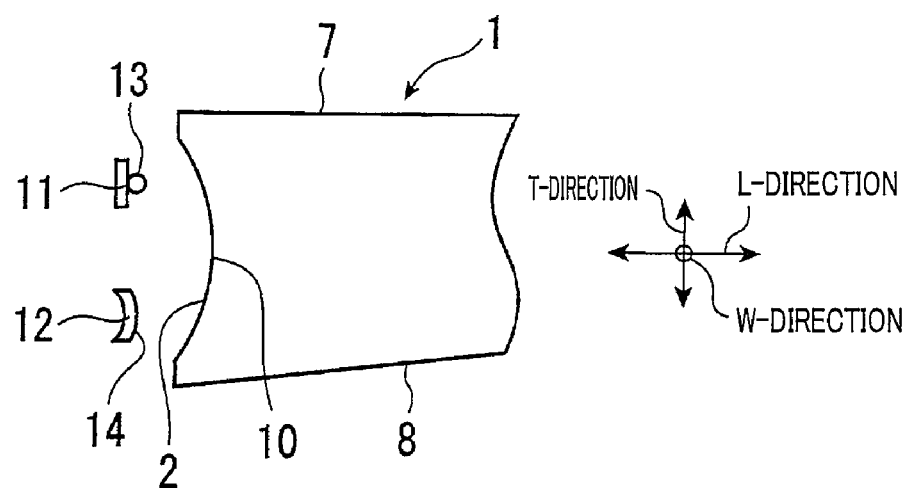

FIG. 4 is a cross-sectional view schematically illustrating an arrangement of the vicinity of an incident surface of another surface light source device of the first embodiment of the present invention.

Figure 5:
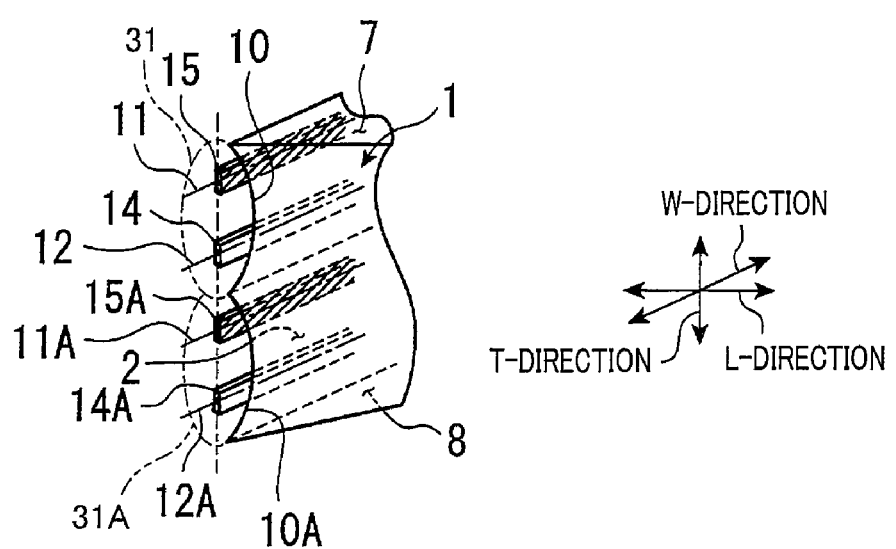

FIG. 5 is a perspective view schematically illustrating an arrangement of the vicinity of an incident surface of yet another surface light source device of the first embodiment of the present invention.

Figure 6:
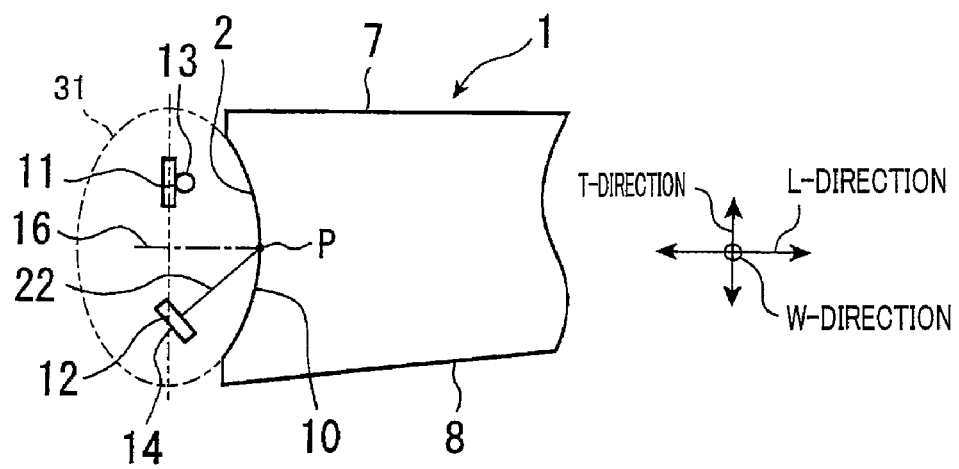

FIG. 6 is a cross-sectional view schematically illustrating an arrangement of the vicinity of an incident surface of yet another surface light source device of the first embodiment of the present invention.

Figure 7:
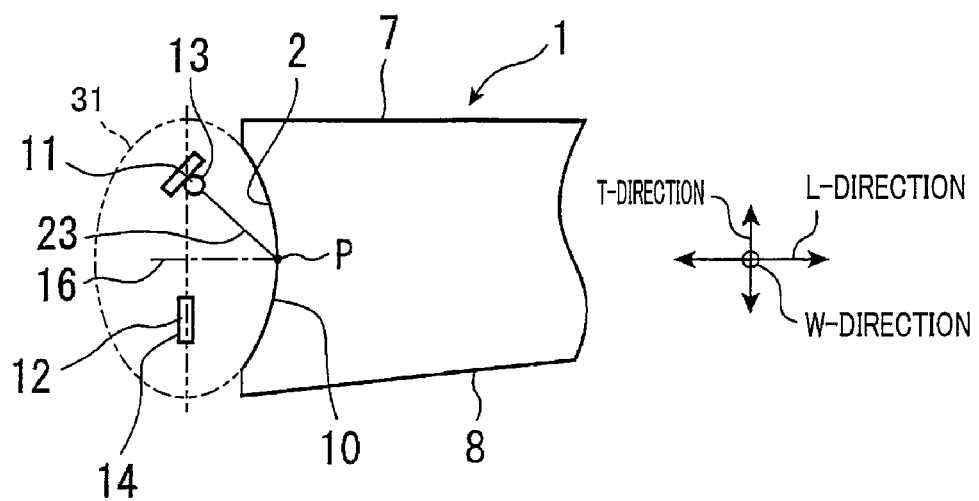

FIG. 7 is a cross-sectional view schematically illustrating an arrangement of the vicinity of an incident surface of yet another surface light source device of the first embodiment of the present invention.

Figure 8:
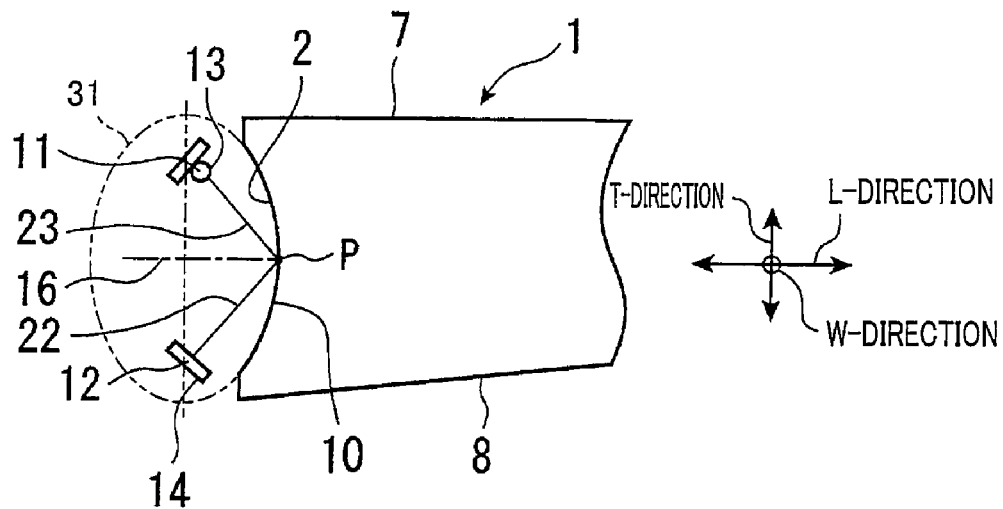

FIG. 8 is a cross-sectional view schematically illustrating an arrangement of the vicinity of an incident surface of yet another surface light source device of the first embodiment of the present invention.

Figure 9:
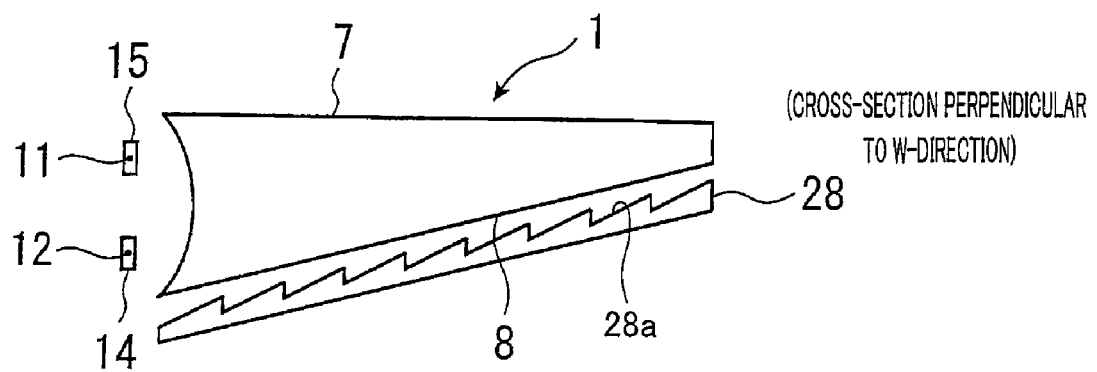

FIG. 9 is a cross-sectional view schematically illustrating still another example of an arrangement of yet another surface light source device of the first embodiment of the present invention. Specifically, FIG. 9 shows a cross-section of the yet another surface light source device which cross-section is perpendicular to a W-direction.

(a) of FIG. 10 is a perspective view schematically illustrating one example of an arrangement of a surface light source device of a second embodiment of the present invention. (b) of FIG. 10 is a cross-sectional view schematically illustrating an arrangement of the vicinity of an incident surface of the surface light source device of (a) of FIG. 10. Specifically, (b) of FIG. 10 shows a cross-section which is perpendicular to the W-direction. (c) of FIG. 10 is a cross-sectional view schematically illustrating the arrangement of the vicinity of the incident surface of the surface light source device of (a) of FIG. 10. Specifically, (c) of FIG. 10 shows a cross-section perpendicular to the T-direction.

Figure 11:
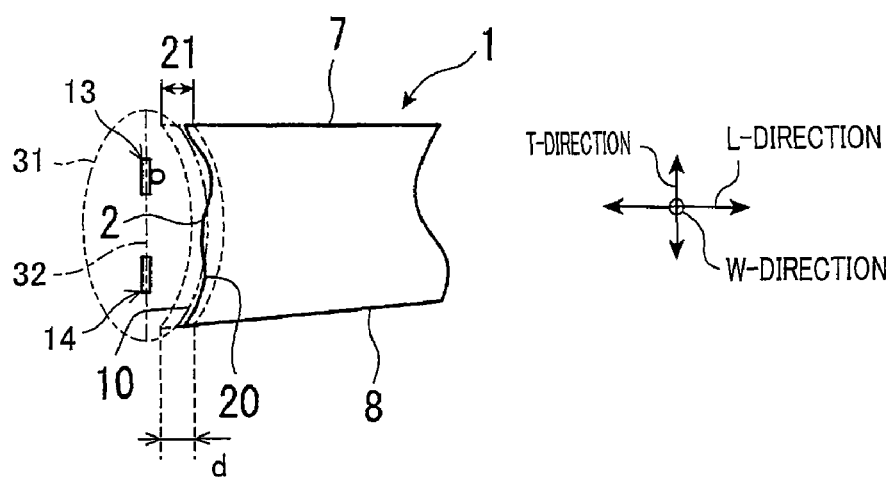

FIG. 11 is a cross-sectional view schematically illustrating an arrangement of the vicinity of an incident surface of a surface light source device of a third embodiment of the present invention.

Figure 12:
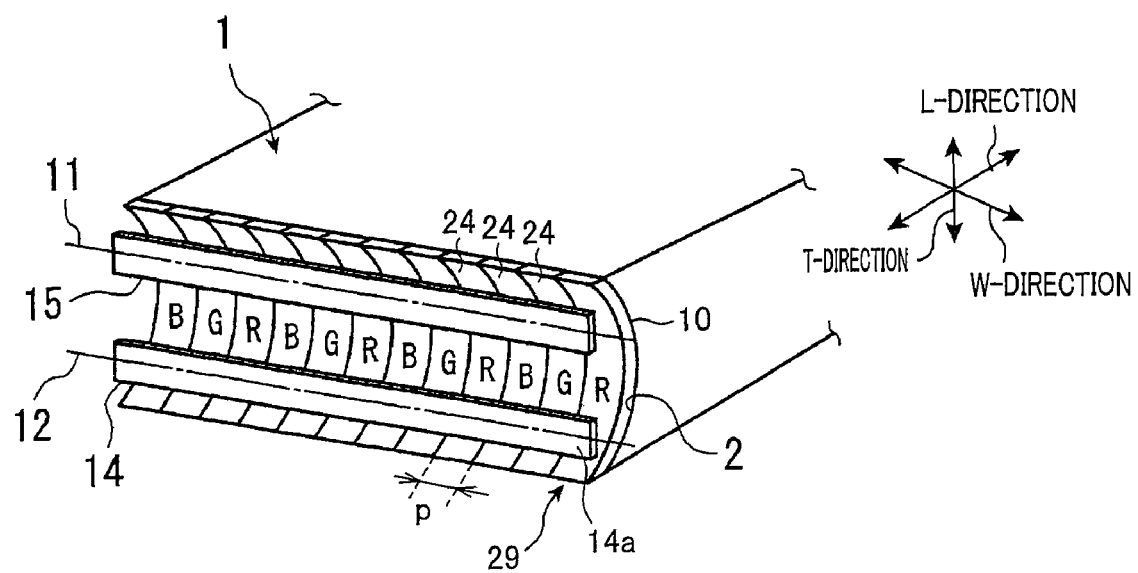

FIG. 12 is a perspective view schematically illustrating an arrangement of the vicinity of an incident surface of a surface light source device of a forth embodiment of the present invention.

Each of (a) and (b) of FIG. 13 is a plan view schematically illustrating a preferred example of a reflector of FIG. 12.

Figure 14:
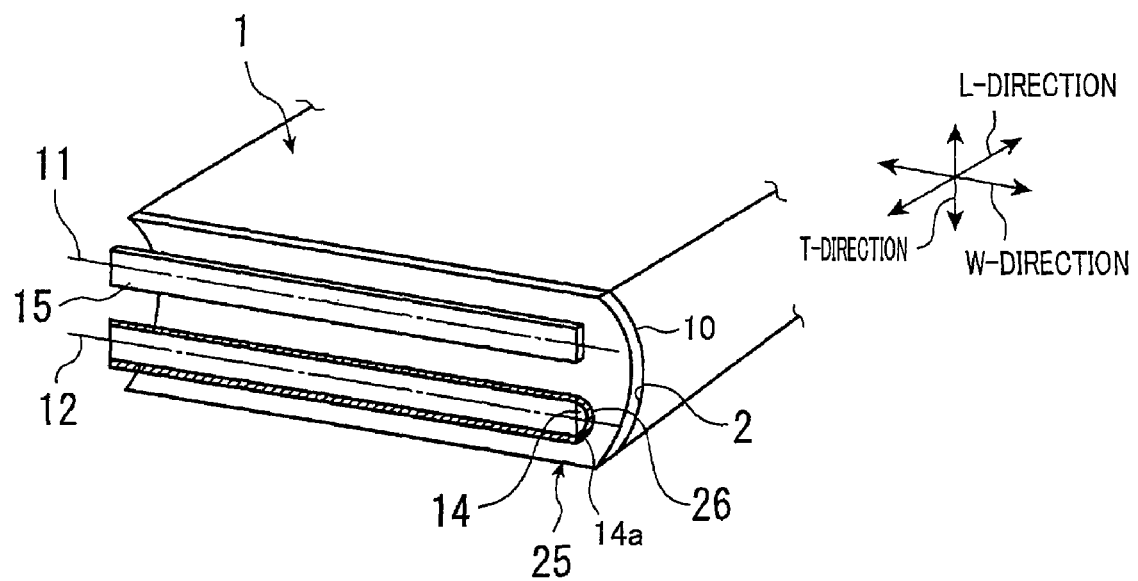

FIG. 14 is a perspective view schematically illustrating an arrangement of the vicinity of an incident surface of a surface light source device of a fifth embodiment of the present invention.

Figure 15:
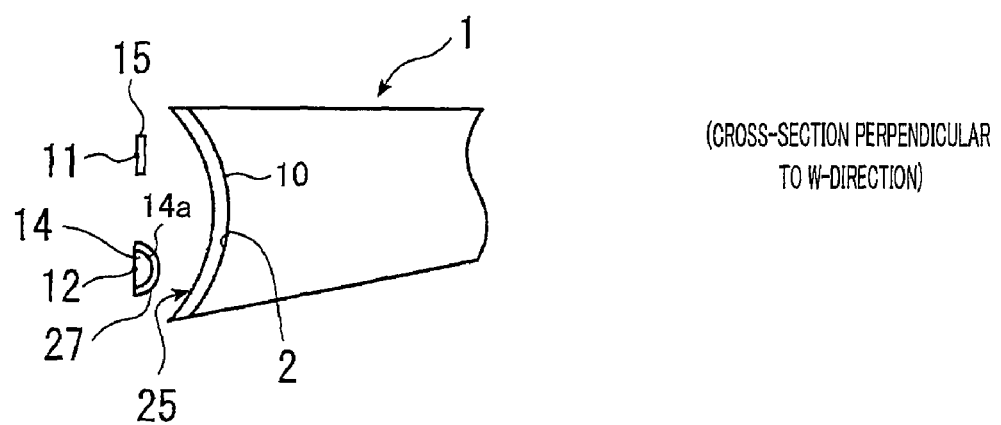

FIG. 15 is a cross-sectional view schematically illustrating an arrangement of the vicinity of an incident surface of another surface light source device of the fifth embodiment of the present invention. Specifically, FIG. 15 shows a cross-section which is perpendicular to the W-direction.

FIG. 16 is a cross-sectional view schematically illustrating a cross-section of a conventional surface light source device which cross-section is perpendicular to a width direction of a light guide plate of the conventional surface light source device.

FIG. 17 is a cross-sectional view schematically illustrating another example of the arrangement of the conventional surface light source device. Specifically, FIG. 17 shows a cross-section which is perpendicular to a width direction of a light guide plate of the conventional surface light source device.

DESCRIPTION OF EMBODIMENTS

First Embodiment

The following describes one embodiment of the present invention, with reference to (a) and (b) of FIG. 1 to FIG. 9.

A surface light source device of the present embodiment is a so-called side-light-type light source device in which a light source is provided beside at least one end surface of a light guide plate. The present embodiment exemplifies a case where the light source is a point light source, and the light source is provided beside at least one end surface (one lateral end part) of the light guide plate. However, the present embodiment is not limited to this.

First, the following deals with an overall arrangement of the light source device of the present embodiment, with reference to (a) and (b) of FIG. 1.

(a) of FIG. 1 is a perspective view (three-dimensional schematic view) schematically illustrating one example of an arrangement of the surface light source device of the present embodiment. (b) of FIG. 1 is a cross-sectional view schematically illustrating an arrangement of the vicinity of an incident surface of the surface light source device of (a) of FIG. 1.

As illustrated in (a) and (b) of FIG. 1, the surface light source device of the present embodiment includes a light guide plate 1, point light sources 13 (light sources), and a reflector 14.

The point light sources 13 are provided so as to face one end part (one end surface) in a length direction of the light guide plate 1 (hereinafter, referred to as "L-direction"). The point light sources 13 are arrayed in a width direction (hereinafter, referred to as "W-direction") of the light guide plate 1.

Examples of the point light sources 13 encompass an LED (Light Emitting Diode) light source and a laser light source. Examples of the LED light source encompass a white LED light source, an RGB-LED light source, and a multicolor LED light source.

The white LED light source combines a plurality of rays of light having respective different wavelengths, in order to emit white light from one LED chip. Examples of the white LED light source encompass a light-emitting element which is a combination of, e.g., a blue LED and a fluorescent material which emits yellow light. However, the white LED light source is not limited to this.

The RGB-LED light source is a light-emitting element in which a red (R) LED, a green (G) LED, and a blue (B) LED are housed in respective packages.

The multicolor LED is a light-emitting element in which LEDs of a plurality of types (e.g., three types) corresponding respectively to different emission colors are housed together in one package so that for each of the plurality of types, at least one LED is housed therein.

At least one light source selected from the group consisting of the white LED light source, the RGB-LED light source, the multicolor LED light source, and the laser light source is adopted as being particularly suitable for the point light sources 13 for the reason that the one light source makes it possible to give directivity to a light distribution and thereby direct almost all source light toward an incident surface 2.

The light guide plate 1 of the surface light source device has, as the incident surface 2 (incident surface 2 of the light guide plate 1), an end part (end surface) facing the point light sources 13. The surface light source device guides light emitted from the point light sources 13 into the light guide plate 1 via the incident surface 2.

One of two end parts (main surfaces and plate surfaces) of the light guide plate 1 in a thickness direction (hereinafter, referred to as "T-direction") of the light guide plate 1 serves as an exit surface 7 of the light guide plate 1 (hereinafter, referred to as "exit surface"). Specifically, the T-direction is a direction perpendicular to the exit surface 7. The L-direction, the W-direction, and the T-direction are perpendicular to each other. The light guide plate 1 directs light incident on the incident surface 2 into the light guide plate 1 so as to emit the light from the exit surface 7 in a surface emitting manner.

Therefore, the light guide plate 1 is designed and manufactured so as to have (i) one of two end parts in the L-direction which one of two end parts serves as the incident surface 2, and (ii) two end parts in the T-direction which respectively serve as the exit surface 7 and a back surface 8 of the light guide plate 1 (hereinafter, abbreviated as "back surface"), and so as to direct light emitted from the point light sources 13 into the light guide plate 1 via the incident surface 2 so as to cause the light to exit from a substantially entire area of the exit surface 7.

The light guide plate 1 is typically made from a transparent resin material such as polycarbonate and polymethylmethacrylate. However, the present embodiment is not limited to this.

The reflector 14 reflects, toward the incident surface 2, light reflected from the incident surface 2 which light is a part of the light emitted from the point light sources 13. A reflecting surface 14a of the reflector 14 faces the incident surface 2.

The reflector 14 can be realized by, e.g., a plate reflector, a film reflector, or the like. A material for the reflector 14 is not particularly limited. Specifically, both a specular reflective material and a diffuse reflective material can be adopted as the material for the reflector 14. In a case where the diffuse reflective material is adopted, a utilization ratio of light which is reflected from the diffuse reflective material so as to be incident on the incident surface 2 is lower, as compared to the case of the specular reflective material. For this reason, it is more preferable to adopt the specular reflective material.

Examples of the specular reflective material encompass metallic materials such as silver and aluminum. Among them, silver is preferable because silver has a high reflectance (specular reflectance). There is a technique for further increasing a reflectance of such a metallic material or the like in such a manner that a dielectric multilayer film made up of a plurality of dielectric films is stacked on such a metallic material or the like.

On the other hand, examples of the diffuse reflective material encompass white materials such as white plastic and white paint.

Among such reflective materials, a material for the reflector 14 is preferably what is obtained by stacking a dielectric multilayer film on aluminum which serves as a specular reflective material, and a dielectric multilayer film stacked on the aluminum, for the reason that such a material causes a maximum ratio of light which re-enters the incident surface 2. Such aluminum coated with the dielectric multilayer film has a reflectance from 95% to 98%. Such a reflectance is higher than that of the reflector 14 made from a metal only.

With reference mainly to (b) of FIG. 1, the following describes relationship between a shape of the incident surface 2 of the light guide plate 1 and respective positions of the point light source 13 and the reflector 14 with respect to the incident surface 2.

As illustrated in (a) and (b) of FIG. 1, the incident surface 2 of the light guide plate 1 has a concave part 10 whose shape is identical to an elliptic arc which is a part of an ellipse 31 having a first focal point which corresponds to the point light sources 13 and a second focal point which corresponds to the reflector 14 (hereinafter, the concave part 10 is simply referred to as "elliptic arc").

The point light sources 13 and the reflector 14 are located on trajectory straight lines 11 and 12 which are parallel to each other, respectively (hereinafter, referred to as ellipse focal point lines). The ellipse focal point lines 11 and 12 are obtained by moving, in the W-direction which is a width direction of the light guide plate 1, the first and second focal points of the ellipse 31 having the elliptic arc 10 (i.e., ellipse which has the elliptic arc 10 as its one part), which ellipse 31 is indicated by a chain double-dashed line (phantom line) in (b) of FIG. 1.

In other words, the elliptic arc 10 (i.e., cross-sectional shape of an entire area of the incident surface 2 in the present embodiment), which is a concave part provided to the incident surface 2 of the light guide plate 1 so as to have a surface shape along an elliptic arc, is an elliptic arc which is a part of the ellipse 31. In (b) of FIG. 1, dashed lines, and dashed-dotted lines indicating light show that the point light sources 13 and the reflector 14 are located in the two focal points of the ellipse 31, respectively.

As illustrated in (b) of FIG. 1, the point light sources 13 and the reflector 14 are located in the two focal points of the ellipse 31 including the elliptic arc 10 (i.e., concave part having a shape of an elliptic arc) as its elliptic arc, respectively. Accordingly, light which is incident on the elliptic arc 10 from the point light sources 13 located on the ellipse focal point line 11 so as to be reflected from the elliptic arc 10 (hereinafter, the light is referred to as "first reflected light") mostly converges on the ellipse focal point line 12. Thus, the reflector 14 located on the ellipse focal point line 11 can reflect back substantially all the first reflected light toward the elliptic arc 10 (incident surface 2). This makes it possible to drastically reduce a loss of light in a stage of light incidence on the light guide plate 1 from the point light sources 13, as compared to conventional cases.

The point light sources 13 and the reflector 14 can be interchanged totally or partially. In addition, another reflecting medium can be provided in a position out of a path on which the first reflected light travels toward the reflector 14. Further, as illustrated in FIG. 2, the point light sources 13, the reflector 14, and the incident surface 2 can be enclosed by a reflector 18 (reflecting mirror). The reflector 18 can have a domal shape such as one illustrated in FIG. 2, or another shape. It is possible to adopt, as the reflector 18, a reflector such as a reflector 104 of FIG. 16 and a reflector 204 of FIG. 17.

The present embodiment has exemplified a case where a light source are the point light sources 13 as illustrated in (a) and (b) of FIG. 1. However, the present embodiment is not limited to this.

FIG. 3 is a perspective view (three-dimensional schematic view) schematically illustrating another example of an arrangement of the surface light source device of the present embodiment.

As illustrated in FIG. 3, the light source can be a surface-emitting light source 15, instead of the point light sources 13 illustrated in (a) and (b) of FIG. 1. In the example of FIG. 3, at least one end part of the light guide plate 1 in its length direction serves as the incident surface 2, and the surface-emitting light source 15 is provided along the incident surface 2.

The surface light source device in this case is also arranged in the same way as the surface light source device having the point light sources 13. In other words, needless to say, it is possible to substitute the surface-emitting light source 15 for the point light sources 13, in both the explanation above and the following explanation.

The surface-emitting light source 15 can preferably be an organic EL (EL: Electroluminescence) light source.

This makes it possible to give directivity to a light distribution. As a result, it becomes possible to direct almost all source light toward an incident surface 2.

For this reason, a light source of the present embodiment is preferably at least one light source selected from the group consisting of a white LED light source, an RGB-LED light source, a multicolor LED light source, a laser light source, and the organic EL light source. In a case where the light source is, e.g., COFL which emits light in all directions, less light is directed toward the elliptic arc 10. As a result, the aforementioned effect cannot be obtained.

The present embodiment has exemplified a case where the incident surface 2 of the light guide plate 1 has a surface shape along the elliptic arc of the ellipse having the first and second focal points which correspond respectively to the point light sources 13 and the reflector 14, as illustrated in (a) and (b) of FIG. 1 to FIG. 3. However, the present embodiment is not limited to this.

FIG. 4 is a cross-sectional view (cross-sectional schematic view) schematically illustrating an arrangement of the vicinity of the incident surface of another surface light source device of the present embodiment. FIG. 5 is a perspective view (three-dimensional schematic view) schematically illustrating an arrangement of the vicinity of the incident surface of yet another surface light source device of the present embodiment.

In the surface light source device of the present embodiment, the elliptic arc 10 can be provided singly in the T-direction which is the thickness direction of the light guide plate 1, as illustrated in (a) and (b) of FIG. 1 to FIG. 4. Alternatively, a plurality of elliptic arcs 10 can be provided as illustrated in FIG. 5.

FIG. 4 deals with a case where the point light sources 13 are adopted as a light source whereas FIG. 5 deals with a case where the surface-emitting light source 15 is adopted as a light source. However, the present embodiment is not limited to this. As noted above, the point light sources 13 and the surface-emitting light source 15 can be interchanged.

In a case where as illustrated in FIG. 5, a plurality of concave parts (elliptic arcs 10) each of which has a surface shape along an elliptic arc are provided in the T-direction which is the thickness direction of the light guide plate 1, each of surface-emitting light sources 15 and a corresponding one of reflectors 14 are provided so as to face a corresponding one of the plurality of concave parts.

In a case where as illustrated in FIG. 5, a plurality of concave parts each of which has a surface shape along an elliptic arc are provided in the T-direction which is the thickness direction of the light guide plate 1, a surface-emitting light source 15 and a corresponding reflector 14 are located on ellipse focal point lines 11 and 12, respectively, for one of two elliptic arcs 10 which are adjacent in the T-direction which is the thickness direction of the light guide plate 1. The ellipse focal point lines 11 and 12 are obtained by moving, in the W-direction which is the width direction of the light guide plate 1, first and second focal points of an ellipse 31 having the elliptic arc 10 as an elliptic arc. On the other hand, for the other one of the two elliptic arcs 10 (hereinafter, this elliptic arc 10 is referred to as "elliptic arc 10A" for convenience of explanation), a surface-emitting light source 15A and a corresponding reflector 14A are located on ellipse focal point lines 11A and 12A, respectively. The ellipse focal point lines 11A and 12A are obtained by moving, in the W-direction which is the width direction of the light guide plate 1, first and second focal points of an ellipse 31A having the elliptic arc 10A as an elliptic arc.

Thus, the plurality of concave parts (elliptic arcs 10) each having a surface shape along an elliptic arc are provided in the T-direction, as illustrated in FIG. 5. This makes it possible to increase an amount of light incident on the light guide plate 1.

On the other hand, in a case where the elliptic arc 10 is provided singly in the T-direction as is described above, it becomes possible to easily design and inexpensively manufacture the surface light source device.

As illustrated in FIG. 4, there is no need to entirely shape the incident surface 2 of the light guide plate 1 into the elliptic arc, unlike the incident surfaces 2 illustrated in (a) and (b) of FIG. 1 to FIG. 3.

However, as illustrated in (a) and (b) of FIG. 1 to FIG. 5, at least a part of the incident surface 2 other than a peripheral part thereof (i.e., most part of the incident surface 2 other than the peripheral part) preferably has a shape of a single elliptic arc or a shape of combined elliptic arcs.

That is, in a case where the elliptic arc 10 is provided singly in the T-direction as is illustrated in (a) an (b) of FIG. 1 to FIG. 4, it is preferable that at least a line of intersection of (i) the part of the incident surface 2 other than the peripheral part and (ii) a plane perpendicular to the W-direction which is the width direction of the light guide plate 1 define a single elliptic arc along the elliptic arc 10.

On the other hand, in a case where the plurality of elliptic arcs 10 are provided in the T-direction as is illustrated in FIG. 5, it is preferable that at least a line of intersection of (i) the part of the incident surface 2 other than the peripheral part and (ii) a plane perpendicular to the W-direction which is the width direction of the light guide plate 1 define combined elliptic arcs 10 along respective surface shapes of the plurality of concave parts (elliptic arcs 10).

It is sufficient for the incident surface 2 of the light guide plate 1 to have the elliptic arc 10 in a region on which the light emitted from the point light sources 13 and the reflected light from the reflector 14 are incident. As described above, where and how many elliptic arcs 10 are formed is not particularly limited.

However, at least the part of the incident surface 2 other than the peripheral part, particularly, at least a main part (most part except the peripheral part) of the incident surface 2 has a shape of the elliptic arc, as described above. This makes it possible to easily adjust respective positions of the light source and the reflector 14, and improve an efficiency of light incident on the incident surface 2 (i.e., an efficiency of light incident on the incident surface 2 from the light source and an efficiency of light incident on the incident surface 2 from the reflector 14).

Therefore, the surface light source device is preferably arranged such that: at least the main part (most part except the peripheral part) of the incident surface 2 has such a concave shape that a line of intersection of the main part and a plane perpendicular to the W-direction defines a single elliptic arc or combined elliptic arcs; and the point light sources 13 and the reflector 14 are located on the ellipse focal point lines 11 and 12, respectively, which are obtained by moving the two focal points of the ellipse 31 of the elliptic arc 10 in the width direction of the light guide plate 1.

In this case, light which is incident, on the main part of the incident surface 2 which main part has the concave part having a surface shape along an elliptic arc, from the point light sources 13 located on one of the ellipse focal point lines 11 and 12 so as to be reflected from the main part (first reflected light) mostly converges on the other one of the ellipse focal point lines 11 and 12. Accordingly, the reflector 14 located on the other one of the ellipse focal point lines 11 and 12 can reflect back substantially all the first reflected light toward the incident surface 2. This makes it possible to drastically reduce a loss of light in the stage of light incidence on the light guide plate 1 from the point light sources 13, as compared to conventional cases.

(a) and (b) of FIG. 1 to FIG. 3, and FIG. 5 illustrate a case where the reflector 14 having the reflecting surface 14a which is flat is adopted. However, a shape of the reflecting surface 14a of the reflector 14 is not limited to this. As illustrated in FIG. 4, the reflecting surface 14a of the reflector 14 can have a surface shape of an elliptic cylinder, for example (convex shape, e.g., convex cylindrical shape extending along the incident surface 2).

From a viewpoint of utilization efficiency of reflected light, the reflecting surface 14a of the reflector 14 has any one of the following surface shapes: a flat surface shape, a spherical surface shape, and the surface shape of the elliptic cylinder, or has a shape which is identical with a combined shape of at least two thereof.

In each case, light converges on a substantially single point on the reflecting surface 14a. As a result, even if the reflector 14 has, e.g., a spherical surface shape, the reflecting surface 14a is a substantially flat surface as viewed from the substantially single point.

The combined shape is formed in a direction parallel to the W-direction. As a result, reflected light from the reflector 14 travels in a random direction with respect to the W-direction. This makes it possible to direct the reflected light toward the incident surface 2 more uniformly.

As described above, the combined surface of the reflector 14 which is located in a position where the reflector 14 is provided is formed so that light reflected from the combined surface can fall within an incidence target range of a corresponding elliptic arc 10. This makes it possible to reflect light toward the elliptic arc 10 in a random direction, as compared to the cases where the reflecting surface 14a has any one of the following simple (i.e., uncombined) surface shapes: a flat surface shape, a spherical surface shape, and a surface shape of an elliptic cylinder. This makes it possible to reflect light toward the incidence surface 2 more uniformly.

The following describes respective directions of the reflector 14 and the light source, with reference to FIGS. 6 to 8. The following also exemplifies the point light sources 13 as a light source. However, the present embodiment is not limited to this.

Each of FIGS. 6 to 8 is a cross-sectional view (cross-sectional schematic view) schematically illustrating an arrangement of the vicinity of an incident surface of yet another surface light source device of one embodiment of the present invention.

As illustrated in FIG. 6 for example, a direction of the reflecting surface 14a of the reflector 14 is preferably adjusted in the present embodiment so that a reflected principal ray 22 from the reflector 14 intersects with a trajectory straight line which is obtained by moving, in the W direction, an intersection point P of a minor axis 16 of the ellipse 31 having the elliptic arc 10 and the elliptic arc 10.

Such adjustment of the direction of the reflecting surface 14a of the reflector 14 makes it possible to further increase light incident on the incident surface 2 (particularly, on the elliptic arc 10) which light is a part of light reflected from the reflector 14. This further increases a utilization ratio of the source light (i.e., light emitted from the point light sources 13).

Similarly, as illustrated in FIG. 8 for example, a direction (light emitting direction) of the point light sources 13 is preferably adjusted so that an emitted principal ray 23 from each of the point light sources 13 intersects with the trajectory straight line which is obtained by moving, in the W direction, the intersection point P of the minor axis 16 of the ellipse 31 having the elliptic arc 10 and the elliptic arc 10.

This makes it possible to further increase light incident on the incident surface 2 (particularly, on the elliptic arc 10) which light is a part of light emitted from the point light source 13. This further increases a utilization ratio of the source light.

It is more preferable to adjust both of respective directions of the reflector 14 and the point light sources 13 as described above than to adjust any one of the directions as described above. In other words, it is more preferable to combine, as illustrated in FIG. 8, both of respective arrangements illustrated in FIGS. 6 and 7 than to separately adopt the arrangements, for the reason that a utilization ratio of the source light is increased.

In the present embodiment, it is more preferable to adopt an arrangement illustrated in FIG. 9, for a further increase of a utilization ratio of the source light.

FIG. 9 is a cross-sectional view (cross-sectional schematic view) schematically illustrating an arrangement of yet another surface light source device of the present embodiment. Specifically, FIG. 9 shows a cross-section (cross-sectional schematic view) of the yet another surface light source device which cross-section is perpendicular to the W-direction.

FIG. 9 illustrates a case where the surface-emitting light source 15 is adopted as a light source. However, as mentioned above, the present embodiment is not limited to this.

In the surface-emitting light source illustrated in FIG. 9, a reflecting mirror 28 is provided to a back surface 8 of a light guide plate 1.

The reflecting mirror 28 reflects, toward the back surface 8 of the light guide plate 1, light leaked from the back surface 8. Therefore, thus providing the reflecting mirror 28 to the back surface 8 of the light guide plate 1 makes it possible to further increase a utilization ratio of the source light.

The reflecting mirror 28 preferably includes the reflecting surface 28a having an area of not less than an area of the back surface 8 of the light guide plate 1. The reflecting surface 28a preferably faces the back surface 8.

In a case where the reflecting surface 28a has an area smaller than that of the back surface 8, it is disadvantageous because the ratio of light, reflected from the reflecting mirror 28 and then incident on the back surface 8, among the light leaked from the back surface 8, becomes small. On the other hand, in a case where the reflecting surface 28a of the reflecting mirror 28 has an area larger than that of the back surface 8, the ratio of light, reflected from the reflecting mirror 28 and then incident on the back surface 8, among the light leaked from the back surface 8, becomes large. Thus, an area of the reflecting surface 28a is preferably larger than the area of the back surface 8.

It is particularly preferable that as illustrated in FIG. 9, the reflecting surface 28a have an uneven surface shape rather than a flat surface shape, for the reason that the light leaked from the back surface 8 can be reflected in a more random direction so as to be directed toward the surface 8 more uniformly.

The present embodiment has exemplified, as the light guide plate 1, a wedge-shaped light guide plate whose incident surface 2 is provided to an end part on a greater thickness side of the light guide plate 1. However, the present embodiment is not limited to this. The light guide plate 1 can be a flat light guide plate having an exit surface 7 and a back surface 8 which are parallel to each other. It can be further arranged such that two end parts of the flat light guide plate in the L-direction serve as two incident surfaces 2. In this case, one light source and one reflector 14 are provided so as to face each of the two incident surfaces 2. Thus, it is sufficient that the light source is provided beside at least one end surface (lateral end part) of the light guide plate.

It can also be arranged such that one of two opposite end parts of the flat light guide plate in the L-direction serves as the incident surface 2, and the other one of the two opposite end parts serves as a reflecting surface.

The reflecting surface can be realized in such a manner that, e.g., a plate reflector, a film reflector, or the like is bonded onto the other one of the two opposite end parts. A material for the reflecting surface is not particularly limited. Specifically, both a specular reflective material and a diffuse reflective material can be adopted as the material. Examples of the specular reflective material encompass metallic materials such as silver and aluminum, as described above. On the other hand, examples of the diffuse reflective material encompass white materials such as white plastic and white paint. Among the reflective materials, it is preferable to adopt a metallic material so as to form, by vacuum deposition or the like, a film on a surface having a surface shape of the reflecting surface, for the reason that a high reflectance can be realized.

Second Embodiment

The following describes another embodiment of the present invention, with reference mainly to (a) to (c) of FIG. 10.

The present embodiment deals with differences between the present embodiment and the first embodiment. Members having the same functions as the first embodiment are given common reference signs, and descriptions of such members are not repeated below.

The present embodiment also exemplifies a case where the point light sources 13 are provided beside one end surface (lateral end part) of the light guide plate 1. However, the present embodiment is not limited to this.

In the first embodiment, (a) of FIG. 1 illustrates that the incident surface 2 itself has a surface shape of an elliptic arc, and only one elliptic arc 10 is provided to the incident surface 2 in the W-direction.

However, the present invention is not limited to this. Preferred embodiments of the present invention encompass, e.g., one illustrated in (a) to (c) of FIG. 10.

(a) of FIG. 10 is a perspective view (three-dimensional schematic view) schematically illustrating one example of an arrangement of a surface light source device of the present embodiment. (b) of FIG. 10 is a cross-sectional view schematically illustrating an arrangement of the vicinity of an incident surface of the surface light source device of (a) of FIG. 10. Specifically, (b) of FIG. 10 shows a cross-section perpendicular to the W-direction. (c) of FIG. 10 is a cross-sectional view schematically illustrating the arrangement of the vicinity of the incident surface of the surface light source device of (a) of FIG. 10. Specifically, (c) of FIG. 10 shows a cross-section perpendicular to the T-direction.

In a case where as illustrated in (a) of FIG. 1, only one elliptic arc 10 is provided to the incident surface 2 in the W-direction, a line of intersection of the elliptic arc 10 and a plane perpendicular to the T-direction which is the thickness direction of the light guide plate 1 defines a straight line as illustrated in (a) of FIG. 1, even if the number and/or positions of elliptic arcs 10 provided in the T-direction vary as illustrated in FIGS. 4 and 5.

In contrast, the surface light source device of the present embodiment is arranged such: that as illustrated in (a) and (c) of FIG. 10, a line 17 of intersection of a plurality of elliptic arcs 10 of the incident surface 2 and a plane perpendicular to the T-direction has a same line shape as a line of intersection of a cylindrical aspheric lens array and a plane perpendicular to an axis of the cylindrical aspheric lens array; and as illustrated in (b) and (c) of FIG. 9, a reflecting surface 14a of each of a plurality of reflectors 14 has a convex shape similar to a surface shape of a corresponding concave part (elliptic arc 10) of the incident surface 2.

Since a reflecting surface 14a of each of a plurality of reflectors 14 has a convex shape similar to a surface shape of a corresponding concave part (elliptic arc 10) of the incident surface 2, it becomes possible to further increase light incident on the incident surface 2 which light is a part of light reflected from the reflecting surfaces 14a. In addition, it is possible to further increase light incident on the reflecting surfaces 14a which light is a part of light (first reflected light) reflected from the incident surface 2, and further increase light incident on the incident surface 2 which light is a part of light reflected from the reflecting surfaces 14a. This further (e.g., to a substantially maximum extent) increases a utilization efficiency of light in the stage of light incidence on the light guide plate 1 from the point light sources 13 which is a light source.

As illustrated in (a) and (c) of FIG. 10, the plurality of elliptic arcs 10 are provided in the W-direction in the surface light source device of the present embodiment.

Also in this case, as illustrated in (a) of FIG. 10, the point light sources 13 and the reflectors 14 are located on ellipse focal point lines 11 and 12, respectively. The ellipse focal point lines 11 and 12 are obtained by moving, in the W-direction, first and second focal points of each of ellipses having the plurality of elliptic arcs 10. Thus, as illustrated in (a) of FIG. 1, the reflectors 14 can be a single reflecting member which extends from one end part to the other end part of the light guide plate 1 in the W-direction along the ellipse focal point line 12.

However, particularly in a case where the point light sources 13 are arrayed as a light source on one of the ellipse focal point lines 11 and 12 as illustrated in (a) of FIG. 10, it is preferable to array, on the other one of the ellipse focal point lines 11 and 12, reflectors 14 each of which has the reflecting surface 14a which is the convex surface, as illustrated in (b) and (c) of FIG. 10.

This makes it possible to further increase light incident on the incident surface 2 which light is a part of light emitted from the point light sources 13. Also, this makes it possible to further increase light incident on respective reflecting surfaces 14a of the reflectors 14 which light is a part of light reflected from the incident surface 2 (first reflected light), and to further increase light incident on the incident surface 2 which light is a part of light reflected from respective reflecting surfaces 14a of the reflector 14. This makes it possible to increase, to a substantially maximum extent, a utilization efficiency of light in the stage of light incidence on the light guide plate 1 from the point light sources 13 which is a light source.

Third Embodiment

The following describes another embodiment of the present invention, with reference mainly to FIG. 11.

The present embodiment deals with differences between the present embodiment and the first and second embodiments. Members having the same functions as the first and second embodiments are given common reference signs, and descriptions of such members are not repeated below.

The present embodiment also exemplifies a case where the point light sources 13 are provided beside one end surface (lateral end part) of the light guide plate 1. However, the present embodiment is not limited to this, as is noted above.

FIG. 11 is a cross-sectional view (cross-sectional schematic view) schematically illustrating an arrangement of the vicinity of an incident surface of a surface light source device of the present embodiment.

Each of the first and second embodiments has dealt with a case where: the incident surface 2 of the light guide plate 1 has at least one elliptic arc 10 which is a concave part having a surface shape along the elliptic arc of the ellipse 31 having the first focal point corresponding to the point light sources 13 and the second focal point corresponding to the reflector 14; and the point light sources 13 and the reflector 14 are located on the ellipse focal point lines 11 and 12, respectively, which are obtained by moving the first and second focal points in the W-direction. However, the present embodiment is not limited to this.

As illustrate in FIG. 11, the surface light source device of the present embodiment has a concave part 20 having a surface shape along a pseudo-elliptic arc (hereinafter, the concave part is simply referred to as "pseudo-elliptic arc") in which: a line of intersection of the incident surface 2 of the light guide plate 1 and a plane perpendicular to the W direction which is a width direction of the light guide plate 1 is a curve or a broken line; and the approximate curve of intersection substantially coincides (preferably, coincides completely) with a part of the ellipse 31 having the first focal point corresponding to the light source (e.g., point light sources 13) and the second focal point corresponding to the reflector 14. As is the case with the first and second embodiments, the point light sources 13 and the reflector 14 are located on the ellipse focal point lines 11 and 12 (see (a) of FIG. 1), respectively, which are obtained by moving the first and second focal points of the ellipse 31 (i.e., the ellipse 31 having the first focal point corresponding to the point light sources 13 and the second focal point corresponding to the reflector 14) in the W-direction of the light guide plate 1. Such an approximate curve of intersection which substantially coincides with a part of the ellipse 31 can be found by, e.g., a least-square method.

Also in the present embodiment, it is sufficient for the incident surface 2 of the light guide plate 1 to have the pseudo-elliptic arc 20 in a region on which the light emitted from the point light sources 13 and the reflected light from the reflector 14 are incident. That is, it is not always necessary to form the whole of the incident surface 2 of the light guide plate 1 into a shape of the pseudo-elliptic arc. On the other hand, it is also preferable in the present embodiment to provide the pseudo-elliptic arc 20 at least to the main part of the incident surface 2, for the same reason as the first embodiment.

That is, the surface light source device of the present embodiment can be arranged such that as illustrated in FIG. 11 for example, a shape of a cross-section, perpendicular to the W-direction, of a concave part which is the main part of the incident surface 2 is a shape of the pseudo-elliptic arc 20 which substantially coincides with the elliptic arc 10, instead of the shape of the elliptic arc 10.

The point light sources 13 and the reflector 14 correspond to the two focal points of the ellipse 31, respectively. Accordingly, the more similar shape to the shape of the elliptic arc of the ellipse 31 the incident surface 2, especially, a region of the incident surface 2 on which region the light from the point light sources 13 is incident has, the larger proportion of light incident on one of the elliptic focal point lines 11 and 12 which one corresponds to the reflector 14 the light reflected from the region (first reflected light) has.

Therefore, the light which have been emitted toward the concave part (i.e., pseudo-elliptic arc 20) from the point light sources 13 located on one of the ellipse focal point lines 11 and 12 and then have been reflected from the pseudo-elliptic arc 20 (first reflected light) is more likely to converge on the other one of the ellipse focal point lines 11 and 12 than conventional cases, in a case where the concave part is provided in the region which is irradiated with the light from the point light sources 13, and the concave part has the shape of the pseudo-elliptic arc.

Although a degree of convergence of the first reflected light on the reflector 14 somewhat decreases as compared to the first and second embodiments in both of which the incident surface 2 has the elliptic arc 10, the present embodiment makes it possible to obtain a sufficiently commensurate effect of reducing a loss of light, as compared to conventional cases. This makes it possible to increase a utilization ratio of the source light, as compared to conventional cases.

In the present embodiment, the shape of the pseudo-elliptic arc can be, e.g., a curve or a broken line, which (i) resides in a zonal region 21 having a width "d" whose center line is the elliptic arc 10 and which is not more than 20% of a length of the major axis 32 of the ellipse 31 of the elliptic arc 10 and (ii) connects with both ends of the zonal region 21 in a length direction thereof, as illustrated in FIG. 11. In the example of FIG. 11, a line of intersection of the incident surface 2 and a plane perpendicular to the W direction which is the width direction of the light guide plate 1 defines a waveform which undulates in the zonal region 21.

That is, the light guide plate 1 of the present embodiment can be arranged such that: the line of intersection of the incident surface 2 and the plane perpendicular to the W-direction which is the width direction of the light guide plate 1 resides in the zonal region 21 having the width "d" (i) whose center line is the elliptic arc 10 which is a part of the ellipse 31 having the two focal points corresponding respectively to the point light sources 13 and the reflector 14 and (ii) which is not more than 20% of the length of the major axis 32 of the ellipse 31; and the light guide plate 1 includes a concave part whose surface shape is a curve or a broken line, which connects with both ends of the zonal region 21 in the T direction which is the length direction thereof.

It is preferable that the pseudo-elliptic arc 20 preferably have as similar to the elliptic arc 10 a shape as possible, from a viewpoint of a purpose of obtaining a higher effect of reducing a loss of light. Therefore, the width "d" of the zonal region 21 is preferably not more than 10%, or more preferably, not more than 5% of the length of the major axis 32 of the ellipse 31.

Fourth Embodiment

The following describes another embodiment of the present invention, with reference mainly to FIG. 12 and (a) and (b) of FIG. 13.

The present embodiment deals with differences between the present embodiment and the first through third embodiments. Members having the same functions as the first through third embodiments are given common reference signs, and descriptions of such members are not repeated below.

The present embodiment exemplifies a case where the surface-emitting light source 15 is provided beside one end surface (lateral end part) of the light guide plate 1. However, the present embodiment is not limited to this, as is noted above.

FIG. 12 is a perspective view schematically illustrating an arrangement of the vicinity of an incident surface 2 of a surface light source device of the present embodiment. Each of (a) and (b) of FIG. 13 is a plan view (schematic plan view) schematically illustrating a preferred example of the reflector 14 of FIG. 11.

As illustrated in FIG. 12, the surface light source device is different from those of the first through third embodiments in that the incident surface 2 of the light guide plate 1 includes dichroic filters 24 for full-color display.

Each of the dichroic filters 24 is a polarizing filter having a characteristic for reflecting light, having a wavelength other than a specific wavelength, which is emitted from the surface-emitting light source 15 so as to selectively allow light having the specific wavelength to pass through.

As illustrated in FIG. 12, it is preferable that: each of the dichroic filters 24 have a surface and a back surface (concave surface and convex back surface) each of which has the same shape as at least the concave part of the incident surface 2; and the convex back surface be attached to the incident surface 2 (concave part) having, as mentioned, the same shape as the convex back surface so as to match (fit in) the incident surface 2.

The at least concave part of the incident surface 2 can be a single concave part or combined concave parts such as the elliptic arc 10; the pseudo-elliptic arc 20; and combined elliptic arcs 10 (combined concave parts having a shape of combined elliptic arcs). Alternatively, the at least concave part can be the whole of the incident surface 2.

As a result, light reflected from the dichroic filters 24 converges on the reflector 14 so as to be reflected back from the reflector 14 toward the dichroic filters 24, as is the case with the light reflected from the incident surface 2 having no dichroic filter 24.

As illustrated in FIG. 12, dichroic filters 24 of a plurality of types each of which selectively allows light having a different wavelength (i.e., color) to pass through are usually combined in actual use of the dichroic filters 24.

In the example illustrated in FIG. 12, three types of dichroic filters 24 which selectively allow rays of light having wavelengths of the three primary colors: R (red), G (green), and B (blue) to pass through are arrayed repeatedly in this order in the W-direction at predetermined intervals (pitch "q"). A dichroic filter column 29 made up of the dichroic filters 24 is thus provided on the incident surface 2.

As described above, a dichroic filter 24 which selectively allows light having the wavelength of R to pass through (R filter), a dichroic filter 24 which selectively allows light having the wavelength of G to pass through (G filter), and a dichroic filter 24 which selectively allows light having the wavelength of B to pass through (B filter) are arrayed in order of the R filter, the G filter, and the B filter, in the present embodiment. However, the dichroic filters 24 can be arrayed repeatedly in another order such as the R filter, the B filter and the G filter, in accordance with an intended use of the surface light source device. Further, dichroic filters 24 which selectively allow rays of light having wavelengths except those of R, G, and B (e.g., having wavelengths of C (cyan), M (magenta), Y (yellow), etc.) to pass through can be added to the R, G, and B filters, or can substitute for at least one of the R, G, and B filters.

For less loss of light, it is important to reflect, toward another color zone, light reflected from each of color zones (e.g., an R zone corresponding to an R filter, a G zone corresponding to a G filter, and a B zone corresponding to a B filter) corresponding respectively to the dichroic filters 24 thus arrayed.

For this purpose, the reflecting surface 14a of the reflector 14 preferably has a surface shape (reflecting surface shape) in which a shape made up of two planes of a prism, which two planes are connected to each other, or a shape of a columnar aspheric lens is repeated (see (a) of FIG. 13 for repetition of the shape made up of two planes of a prism; see (b) of FIG. 13 for repetition of the shape of a columnar aspheric lens) in the W-direction at intervals of not more than (more preferably, less than) intervals (pitch "q") at which the dichroic filters 24 are provided.

Examples of the repetition of the shape of a columnar aspheric lens encompass repetition of a shape of a convex lens (half-moon-shaped lens) whose one surface is a curved surface. However, the present embodiment is not limited to this.

Alternatively, the reflecting surface shape can be a shape in which the repetition of the shape made up of two planes of a prism (see (a) of FIG. 13) and the repetition of the shape of a columnar aspheric lens (see (b) of FIG. 13) are mixed and combined with each other in such a manner that at least a part of the repetition of the shape made up of two planes of a prism is substituted by repetition of the shape of a columnar aspheric lens.

That is, the reflecting surface 14a of the reflector 14 preferably has, in the W direction at intervals of not more than (more preferably, less than) the pitch "q" at which the dichroic filters 24 of the dichroic filter column 29 are provided, a surface shape of (i) repetition of a shape made up of two planes of a prism, which two planes are connected to each other, (ii) repetition of a shape of a columnar aspheric lens, or (iii) a shape in which at least one shape made up of two planes of a prism, which two planes are connected to each other, and at least one shape of the columnar aspheric lens are mixed and combined with each other. Particularly, the reflecting surface 14a more preferably has a surface shape in which a shape made up of two planes of a prism, which two planes are connected to each other, a shape of a columnar aspheric lens, or a combination thereof is repeated in the W direction at intervals of not more than (more preferably, less than) the pitch "q" at which the dichroic filters 24 are provided.

This reduces light which is incident on the reflector 14 from one of the color zones so as to be reflected from the reflector 14 toward the same one of the color zones. As a result, a loss of the light can be further reduced.

For example, in a case where as illustrated in (a) and (b) of FIG. 13, light reflected from an R zone in the dichroic filter column 29 (light having a wavelength of a color other R) is reflected from the reflector 14, the arrangement makes it possible to direct, not toward the R zone but toward G and B zones adjacent to the R zone, a larger proportion of light thus reflected from the reflector 14. That is, the arrangement makes it possible to reduce a loss of light which is caused in such a manner that light having a wavelength of a color other than R is reflected back toward the R zone so as to be reflected from the R zone. The same effect can be obtained even if the R zone is substituted by a G or B zone. Thus, a utilization ratio of light can be further increased by the reduction of the loss of light.

Fifth Embodiment

The following describes another embodiment of the present invention, with reference mainly to FIGS. 14 and 15.

The present embodiment deals with differences between the present embodiment and the first through third embodiments. Members having the same functions as the first through third embodiments are given common reference signs, and descriptions of such members are not repeated below.

The present embodiment also exemplifies a case where the surface-emitting light sources 15 is provided beside one end surface (lateral end part) of the light guide plate 1. However, the present embodiment is not limited to this, as is noted above.

FIG. 13 is a perspective view (three-dimensional schematic view) schematically illustrating an arrangement of the vicinity of an incident surface 2 of a surface light source device of the present embodiment. FIG. 14 is a cross-sectional view (cross-sectional schematic view) schematically illustrating an arrangement of the vicinity of an incident surface of another surface light source device of the present embodiment. Specifically, FIG. 14 shows a cross-section perpendicular to the W-direction.

As illustrated in FIG. 13, the surface light source device of the present embodiment is different from those of the first through third embodiments in that a polarization element 25 and a quarter wave plate 26 having a wide viewing angle are provided for application to a display apparatus utilizing polarization.

The polarization element 25 is a polarization element for selectively allowing only light, which is polarized in one direction and has a corresponding wavelength, out of the light emitted from the surface-emitting light source 15 to pass through the polarization element so as to be incident on the incident surface 2 of the light guide plate 1s.

The polarization element 25 can be a wire grid polarizer.

The quarter wave plate 26 having a wide viewing angle is a wave plate for changing, by 90°, a polarization direction of light reflected from the polarization element 25.

As illustrated in FIG. 11, it is preferable that: the polarization element 25 include a surface and a back surface (concave surface and convex back surface) each having the same shape as at least the concave part of the incident surface 2; and the convex back surface be attached to that incident surface 2 (concave part) of the light guide plate 1 which has, as mentioned, the same shape as the convex back surface so as to match (fit in) the incident surface 2. On the other hand, the quarter wave plate 26 having a wide viewing angle is preferably provided on the reflecting surface 14a of the reflector 14.

The at least concave part of the incident surface 2 can be a single concave part or combined concave parts such as the elliptic arc 10; the pseudo-elliptic arc 20; and combined elliptic arcs 10 (combined concave parts having a shape of combined elliptic arcs). Alternatively, the at least concave part can be the whole of the incident surface 2.

According to the arrangement, light reflected from the polarization element 25 converges on the reflector 14, as is the case with the light reflected from that incident surface 2 of the light guide plate 1 on which no polarization element 25 is provided. The light which have thus converged on the reflector 14 passes through the quarter wave plate 26 toward the reflector 14 so that a polarization direction of the light is changed by 90°. Then, the light is reflected from the reflecting surface 14a of the reflector 14 so that a polarization direction of the light is changed by 180°. Then, the light passes through the quarter wave plate 26 again so that the polarization direction of the light is changed by 90°. As a result, the light has the same polarization direction as the source light so as to be incident on the polarization element 25. This allows light having a small unevenness in light polarization to be efficiently incident on the light guide plate 1.

For use in which a wide viewing angle is not required, as illustrated in FIG. 15, it is possible to provide a quarter wave plate 27 on the reflecting surface 14a of the reflector 14, instead of the quarter wave plate 26 having a wide viewing angle.

The quarter wave plate 27 causes a phase difference of light by just ¼ only in a case where the light is perpendicularly incident on the quarter wave plate 27. In a case where light is incident on the quarter wave plate 27 at an angle other than a right angle, the quarter wave plate 27 causes a phase difference other than the aforementioned phase difference. In contrast, the quarter wave plate 27 having a wide viewing angle causes a phase difference of light by just ¼ in both cases where the light is incident on the quarter wave plate 26 perpendicularly or at an angle other than the right angle.

Usually, the quarter wave plate is made from a uniaxial refractive index medium. The quarter wave plate having a wide viewing angle is made from a biaxial refractive index medium. This causes the aforementioned difference of characteristics.

In the present invention, light emitted from a light source such as the point light sources 13 is not always perpendicularly incident on the concave part (on, e.g., the elliptic arc 10) of the incident surface 2. Therefore, the quarter wave plate 26 having a wide viewing angle is more suitable for the present invention than the quarter wave plate 27. However, the quarter wave plate 26 having a wide viewing angle is higher in cost than the quarter wave plate 27. Therefore, in a case where priority is given to cost reduction by sacrificing the characteristics somewhat, the quarter wave plate 27 can be adopted.

The following describes an examination result of the effect of the present invention, by showing an example and a comparative example. However, the present invention is not limited to the following example.

First Example

The surface light source device illustrated in (a) and (b) of FIG. 1 was experimentally made. The point light sources 13 realized by LEDs were illuminated so that a luminance in a predetermined region within the exit surface 7 was measured by use of a spectroradiometer ("SR-UL1R" (product name) manufactured by Topcon Technohouse Corporation).

The point light source 13, the reflector 14, and the exit surface 7 were enclosed by a reflector 18 (see FIG. 2) which is similar to the reflector 104 of FIG. 16. The light guide plate 1 was made in such a manner that: a material which is polymethylmethacrylate (PMMA; refractive index=1.4835; refractive index of the incident surface 2 with respect to a perpendicular incident light=approximately 4% is shaped into a wedge shape; and the incident surface 2 is shaped into a concave surface whose cross-sectional shape perpendicular to the W-direction is an elliptic arc. Thus, a concave part (elliptic arc 10) which has a surface shape along an elliptic arc is formed on the incident surface 2. The point light sources 13 and the reflector 14 are located on one and the other of the ellipse focal point lines 11 and 12, respectively.

First Comparative Example

On the other hand, in a comparative example, the shape of the concave surface of the incident surface 2 of the first example was changed to a flat shape. Except this, the surface light source device was experimentally made and a luminance was measured by the same method as the first example.

As a result, a measurement of the luminance of the first example was higher, by approximately 12%, than that of the first comparative example. The effect of the present invention was thus confirmed.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The surface light source device of the present invention is suitably applicable to a backlight of a transmissive LCD, a backlight of a transflective LCD, an auxiliary light source (front light) of a reflective LCD, or the like.

REFERENCE SIGNS LIST

1 Light guide plate
2 Incident surface (incident surface of light guide plate)
7 Exit surface (exit surface of light guide plate)
8 Back surface (back surface of light guide plate)
10 Elliptic arc (concave part)
10A Elliptic arc (concave part)
11 Ellipse focal point line (two parallel trajectory straight lines)
11A Ellipse focal point line (two parallel trajectory straight lines)
12 Ellipse focal point line (two parallel trajectory straight lines)

12A Ellipse focal point line (two parallel trajectory straight lines)
13 Point light source (light source)
14 Reflector
14A Reflector
14a Reflecting surface
15 Surface-emitting light source (light source)
16 Minor axis
17 Line of intersection
18 Reflector
20 Pseudo-elliptic arc (concave part)
21 Zonal region
22 Reflected principal ray
23 Emitted principal ray
24 Dichroic filter
25 Polarization element
26 Quarter wave plate having a wide viewing angle
27 Quarter wave plate
28 Reflecting mirror
28a Reflecting surface
29 Dichroic filter column
31 Ellipse
31A Ellipse
32 Major axis
P Intersection point
q Pitch

The invention claimed is:

1. A surface light source device comprising:
at least one light source;
a light guide plate having (i) two end parts in its length direction, at least one of which serves as an incident surface, and (ii) two end parts in its thickness direction which serve as an exit surface and a back surface, the light guide plate directing light, emitted from the at least one light source, incident on the incident surface, so as to cause the light to exit from a substantially entire area of the exit surface, and
at least one reflector which reflects and directs, toward the incident surface, part of the light which is emitted from the at least one light source and is then reflected from the incident surface,
the incident surface having at least one concave part whose shape is identical to an elliptic arc which is a part of at least one ellipse having a first focal point which corresponds to said at least one light source and a second focal point which corresponds to said at least one reflector, and
said at least one light source and said at least one reflector being respectively provided on first and second trajectory straight lines parallel to each other, the first trajectory straight line being obtained by moving the first focal point in a width direction of the light guide plate, the second trajectory straight line being obtained by moving the second focal point in the width direction, the first and second focal points being focal points of the at least one ellipse including a surface shape of the at least one concave part as its elliptic arc.

2. The surface light source device as set forth in claim 1, wherein:
said at least one concave part is provided singly in the thickness direction; and
at least a line of intersection of (i) a part of the incident surface other than a peripheral part of the incident surface and (ii) a plane perpendicular to the width direction of the light guide plate defines a single elliptic arc along a surface shape of the concave part.

3. The surface light source device as set forth in claim 1, wherein:
said at least one concave part is made up of a plurality of concave parts provided in the thickness direction;
at least a line of intersection of (i) a part of the incident surface other than a peripheral part of the incident surface and (ii) a plane perpendicular to the width direction of the light guide plate defines combined elliptic arcs along respective surface shapes of the plurality of concave parts; and
in each of the plurality of concave parts, a corresponding light source and a corresponding reflector being respectively provided on first and second trajectory straight lines parallel to each other, the first trajectory straight line being obtained by moving a corresponding first focal point of a corresponding ellipse in a width direction, and the second trajectory straight line being obtained by moving a corresponding second focal point of the corresponding ellipse in the width direction, the corresponding first focal point and the corresponding second focal point being focal points of the corresponding ellipse including corresponding one of the plurality of concave parts as its elliptic arc.

4. A surface light source device comprising:
at least one light source;
a light guide plate having (i) two end parts in its length direction, at least one of which serves as an incident surface, and (ii) two end parts in its thickness direction which serve as an exit surface and a back surface, the light guide plate directing light, emitted from the at least one light source, incident on the incident surface, so as to cause the light to exit from a substantially entire area of the exit surface, and
at least one reflector which reflects and directs, toward the incident surface, part of the light which is emitted from the at least one light source and is then reflected from the incident surface,
the incident surface having at least one concave part, having a pseudo-elliptic arc, in which (i) a line of intersection of the incident surface and a plane perpendicular to the width direction of the light guide plate is a curve or a broken line and (ii) the line of intersection substantially coincides with a part of at least one ellipse having a first focal point which corresponds to said at least one light source and a second focal point which corresponds to said at least one reflector, and
said at least one light source and said at least one reflector being respectively provided on first and second trajectory straight lines parallel to each other, the first trajectory straight line being obtained by moving the first focal point in a width direction of the light guide plate, the second trajectory straight line being obtained by moving the second focal point in the width direction.

5. The surface light source device as set forth in claim 1, wherein said at least one light source is at least one light source selected from the group consisting of a white LED light source, an RGB-LED light source, a multicolor LED light source, an organic EL light source, and a laser light source.

6. The surface light source device as set forth in claim 1, wherein a reflecting surface of said at least one reflector is any one of a flat surface, a spherical surface, a surface of an elliptic tube, and a combination of at least two thereof.

7. The surface light source device as set forth in claim 1, wherein a direction in which the reflecting surface of said at least one reflector faces is adjusted so that a principal ray reflected from the reflecting surface intersects with a trajectory straight line which is obtained by moving, in the width direction of the light guide plate, an intersection point of (i) a minor axis of said at least one ellipse of the elliptic arc and (ii) the elliptic arc.

8. The surface light source device as set forth in claim 1, wherein: a direction in which said at least one light source faces is adjusted so that a principal ray emitted from said at least one light source intersects with the trajectory straight line which is obtained by moving the intersection point of (i) the minor axis of said at least one ellipse of the elliptic arc and (ii) the elliptic arc.

9. The surface light source device as set forth in claim 1, wherein:
   a line of intersection of said at least one concave part and a plane perpendicular to the thickness direction of the light guide plate has a same line shape as a line of intersection of a cylindrical aspheric lens array and a plane perpendicular to an axis of the cylindrical aspheric lens array; and
   the reflecting surface of said at least one reflector has a shape similar to the surface shape of said at least one concave part.

10. The surface light source device as set forth in claim 1, further comprising at least one dichroic filter for reflecting light, having a wavelength other than a specific wavelength, which is emitted from said at least one light source so as to selectively allow light having the specific wavelength to pass through,
   said at least one dichroic filter having a concave surface and a convex back surface, the concave surface and the convex back surface having a same surface shape as said at least one concave part, the convex back surface being attached to said at least one concave part so as to match said at least one concave part.

11. The surface light source device as set forth in claim 10, wherein:
   said at least one dichroic filter is made up of a plurality of dichroic filters provided in the width direction of the light guide plate;
   any neighboring dichroic filters of the plurality of dichroic filters each selectively allow light having a different wavelength to pass thorough; and
   the reflecting surface of said at least one reflector has a surface shape in which a shape made up of two planes of a prism, which two planes are connected to each other, a shape of a columnar aspheric lens, or a combination thereof is repeated in the width direction of the light guide plate at intervals of not more than intervals at which said at least one dichroic filter is provided.

12. The surface light source device as set forth in claim 10, wherein:
   said at least one dichroic filter is made up of a plurality of dichroic filters provided in the width direction of the light guide plate;
   any neighboring dichroic filters of the plurality of dichroic filters each selectively allow light having a different wavelength to pass thorough; and
   the reflecting surface of said at least one reflector has, in the width direction of the light guide plate at intervals of not more than intervals at which said at least one dichroic filter is provided, a surface shape of (i) repetition of a shape made up of two planes of a prism, which two planes are connected to each other, (ii) repetition of a shape of a columnar aspheric lens, or (iii) a shape in which at least one shape made up of two planes of a prism, which two planes are connected to each other, and at least one shape of the columnar aspheric lens are mixed and combined with each other.

13. The surface light source device as set forth in claim 1, further comprising:
   a polarization element for selectively allowing only light, which is polarized in one direction and has a corresponding wavelength, out of the light emitted from said at least one light source to pass through the polarization element; and
   a quarter wave plate, having a wide viewing angle, for changing, by 90°, a polarization direction of light which is reflected from the polarization element,
   said polarization element having a concave surface and a convex back surface, the concave surface and the convex back surface having a same surface shape as said at least one concave part, the convex back surface being attached to the incident surface in accordance with the surface shape of the at least one concave part, and
   the quarter wave plate being provided on the reflecting surface of said at least one reflector.

14. The surface light source device as set forth in claim 1, further comprising:
   a polarization element for selectively allowing only light, which is polarized in one direction and has a corresponding wavelength, out of the light emitted from said at least one light source to pass through the polarization element; and
   a quarter wave plate,
   said polarization element having a concave surface and a convex back surface, the concave surface and the convex back surface having a same surface shape as said at least one concave part, the convex back surface being attached to the incident surface in accordance with the surface shape of the at least one concave part, and
   the quarter wave plate being provided on the reflecting surface of said at least one reflector.

15. The surface light source device as set forth in claim 1, further comprising a reflecting mirror facing the back surface of the light guide plate,
   the reflecting mirror having a reflecting surface which faces the back side of the light guide plate and whose area is not less than an area of the back surface of the light guide plate.

16. The surface light source device as set forth in claim 4, wherein said at least one light source is at least one light source selected from the group consisting of a white LED light source, an RGB-LED light source, a multicolor LED light source, an organic EL light source, and a laser light source.

17. The surface light source device as set forth in claim 4, wherein a reflecting surface of said at least one reflector is any one of a flat surface, a spherical surface, a surface of an elliptic tube, and a combination of at least two thereof.

18. The surface light source device as set forth in claim 4, wherein a direction in which the reflecting surface of said at least one reflector faces is adjusted so that a principal ray reflected from the reflecting surface intersects with a trajectory straight line which is obtained by moving, in the width direction of the light guide plate, an intersection point of (i) a minor axis of said at least one ellipse of the elliptic arc and (ii) the elliptic arc.

19. The surface light source device as set forth in claim 4, wherein: a direction in which said at least one light source faces is adjusted so that a principal ray emitted from said at least one light source intersects with the trajectory straight line which is obtained by moving the intersection point of (i) the minor axis of said at least one ellipse of the elliptic arc and (ii) the elliptic arc.

20. The surface light source device as set forth in claim 4, wherein:
    a line of intersection of said at least one concave part and a plane perpendicular to the thickness direction of the light guide plate has a same line shape as a line of intersection of a cylindrical aspheric lens array and a plane perpendicular to an axis of the cylindrical aspheric lens array; and
    the reflecting surface of said at least one reflector has a shape similar to the surface shape of said at least one concave part.

21. The surface light source device as set forth in claim 4, further comprising at least one dichroic filter for reflecting light, having a wavelength other than a specific wavelength, which is emitted from said at least one light source so as to selectively allow light having the specific wavelength to pass through,
    said at least one dichroic filter having a concave surface and a convex back surface, the concave surface and the convex back surface having a same surface shape as said at least one concave part, the convex back surface being attached to said at least one concave part so as to match said at least one concave part.

22. The surface light source device as set forth in claim 21, wherein:
    said at least one dichroic filter is made up of a plurality of dichroic filters provided in the width direction of the light guide plate;
    any neighboring dichroic filters of the plurality of dichroic filters each selectively allow light having a different wavelength to pass thorough; and
    the reflecting surface of said at least one reflector has a surface shape in which a shape made up of two planes of a prism, which two planes are connected to each other, a shape of a columnar aspheric lens, or a combination thereof is repeated in the width direction of the light guide plate at intervals of not more than intervals at which said at least one dichroic filter is provided.

23. The surface light source device as set forth in claim 21, wherein:
    said at least one dichroic filter is made up of a plurality of dichroic filters provided in the width direction of the light guide plate;
    any neighboring dichroic filters of the plurality of dichroic filters each selectively allow light having a different wavelength to pass thorough; and
    the reflecting surface of said at least one reflector has, in the width direction of the light guide plate at intervals of not more than intervals at which said at least one dichroic filter is provided, a surface shape of (i) repetition of a shape made up of two planes of a prism, which two planes are connected to each other, (ii) repetition of a shape of a columnar aspheric lens, or (iii) a shape in which at least one shape made up of two planes of a prism, which two planes are connected to each other, and at least one shape of the columnar aspheric lens are mixed and combined with each other.

24. The surface light source device as set forth in claim 4, further comprising:
    a polarization element for selectively allowing only light, which is polarized in one direction and has a corresponding wavelength, out of the light emitted from said at least one light source to pass through the polarization element; and
    a quarter wave plate, having a wide viewing angle, for changing, by 90°, a polarization direction of light which is reflected from the polarization element,
    said polarization element having a concave surface and a convex back surface, the concave surface and the convex back surface having a same surface shape as said at least one concave part, the convex back surface being attached to the incident surface in accordance with the surface shape of the at least one concave part, and
    the quarter wave plate being provided on the reflecting surface of said at least one reflector.

25. The surface light source device as set forth in claim 4, further comprising:
    a polarization element for selectively allowing only light, which is polarized in one direction and has a corresponding wavelength, out of the light emitted from said at least one light source to pass through the polarization element; and
    a quarter wave plate,
    said polarization element having a concave surface and a convex back surface, the concave surface and the convex back surface having a same surface shape as said at least one concave part, the convex back surface being attached to the incident surface in accordance with the surface shape of the at least one concave part, and
    the quarter wave plate being provided on the reflecting surface of said at least one reflector.

26. The surface light source device as set forth in claim 4, further comprising a reflecting mirror facing the back surface of the light guide plate,
    the reflecting mirror having a reflecting surface which faces the back side of the light guide plate and whose area is not less than an area of the back surface of the light guide plate.

* * * * *